Jan. 23, 1968  C. G. AUSTIN, JR., ET AL  3,364,826
CARTON FORMING APPARATUS
Filed Sept. 27, 1965  9 Sheets-Sheet 5
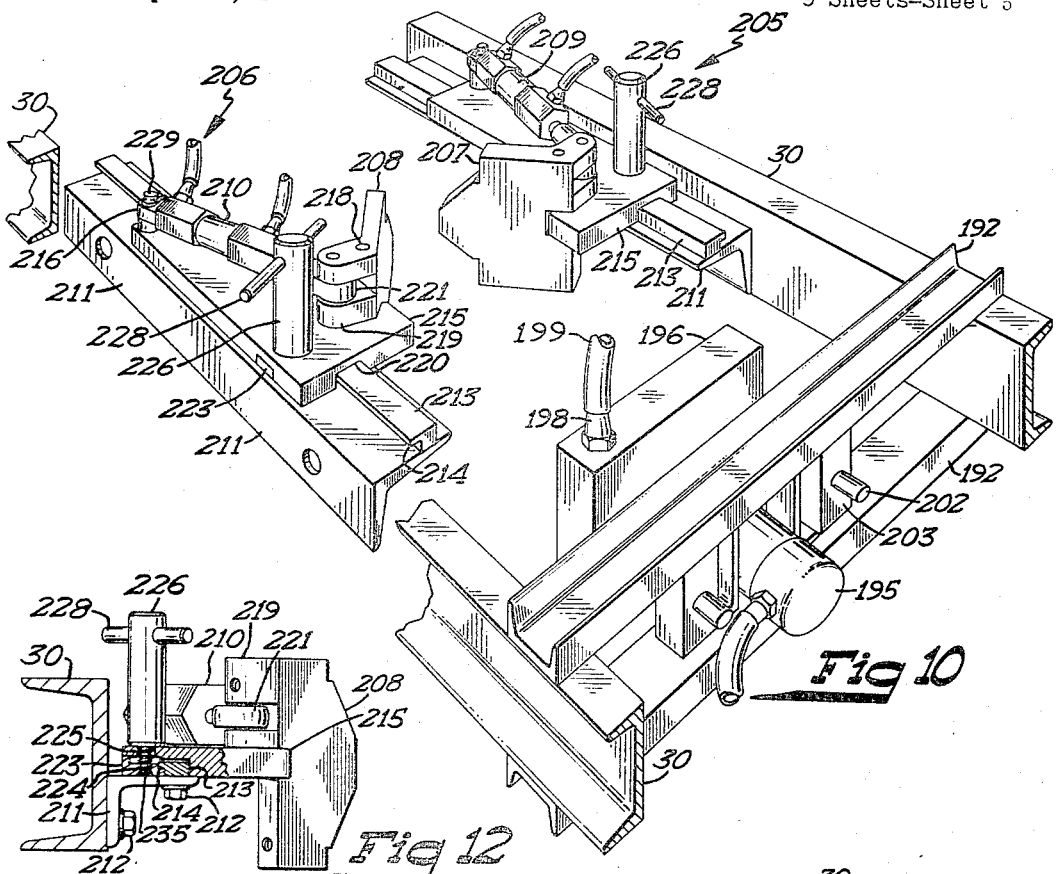
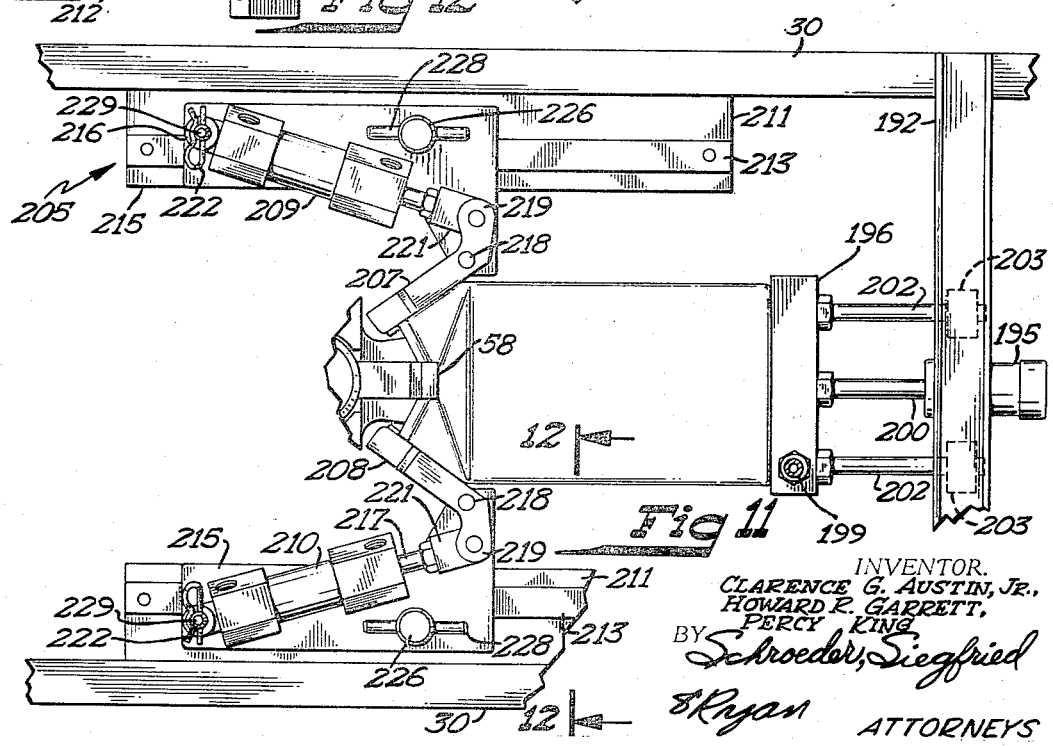
INVENTOR.
CLARENCE G. AUSTIN, JR.,
HOWARD R. GARRETT,
PERCY KING
BY Schroeder, Siegfried
& Ryan
ATTORNEYS INVENTORS
CLARENCE G. AUSTIN, JR.,
HOWARD R. GARRETT,
PERCY KING
BY Schroeder, Siegfried
& Ryan  ATTORNEYS INVENTORS
CLARENCE G. AUSTIN, JR.,
HOWARD R. GARRETT,
PERCY KING
BY Schroeder, Siegfried
& Ryan ATTORNEYS INVENTORS
CLARENCE G. AUSTIN, JR.,
HOWARD R. GARRETT,
PERCY KING
BY Schroeder, Siegfried
& Ryan
ATTORNEYS

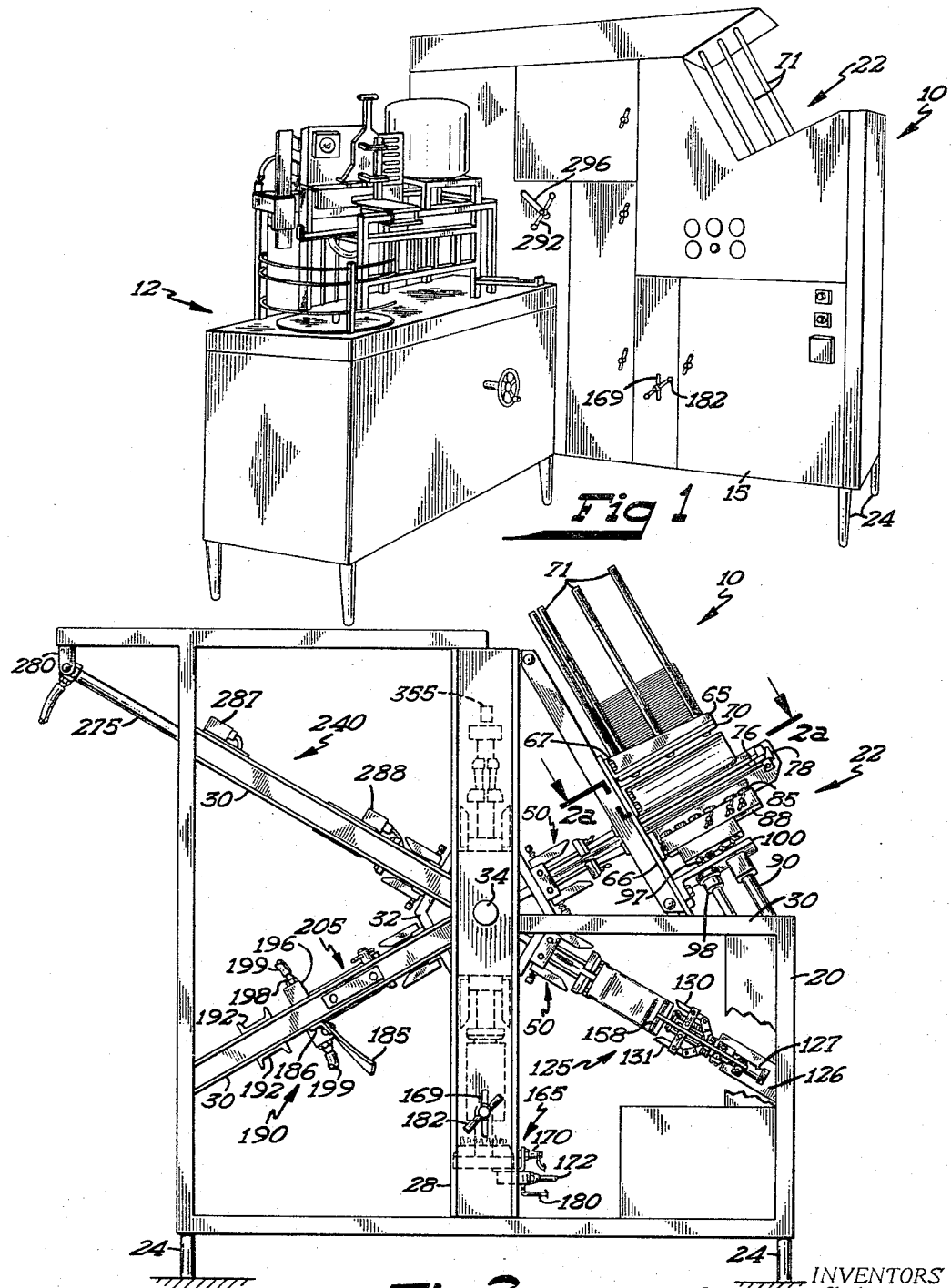

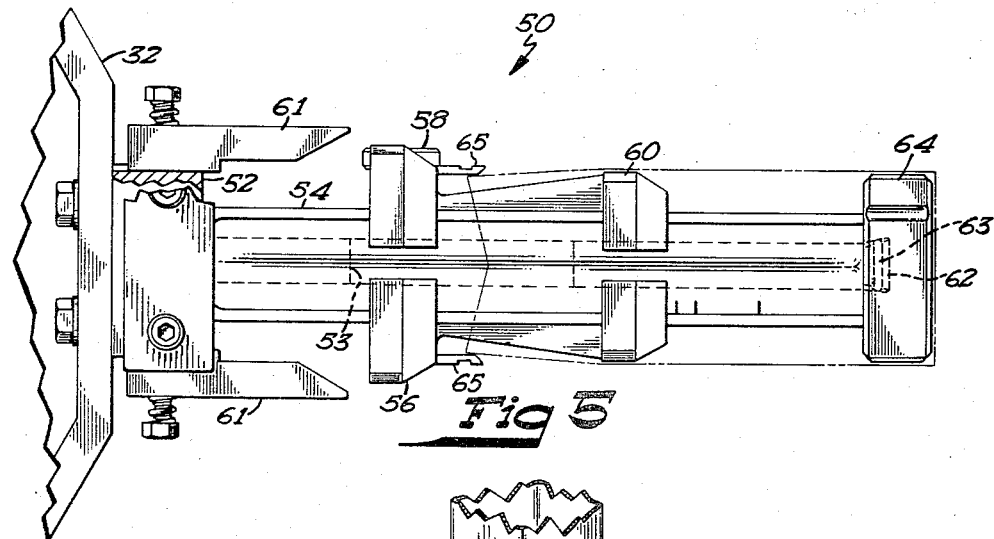
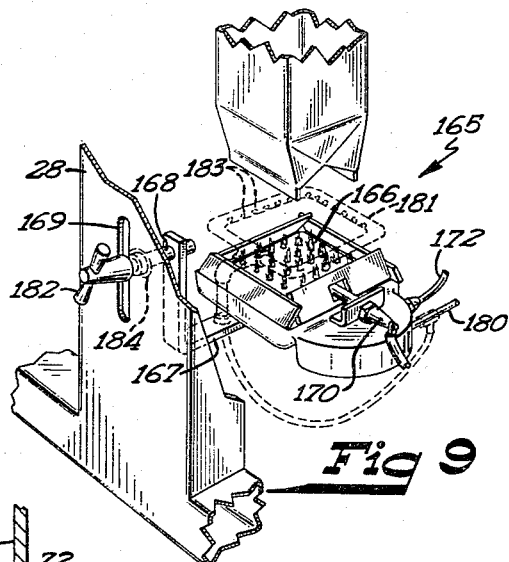
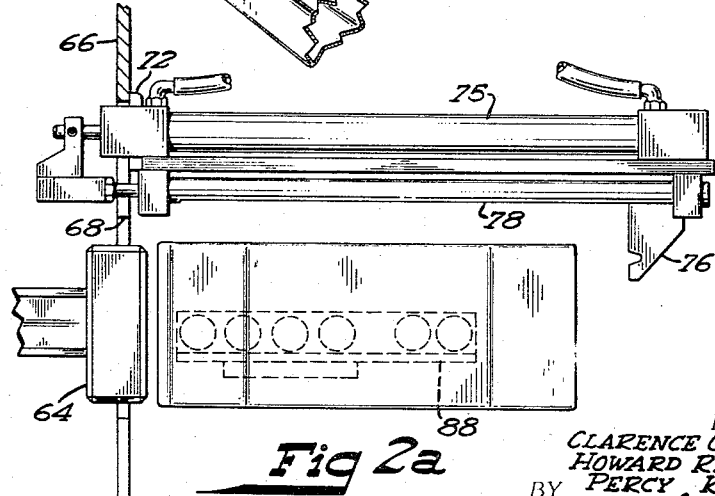

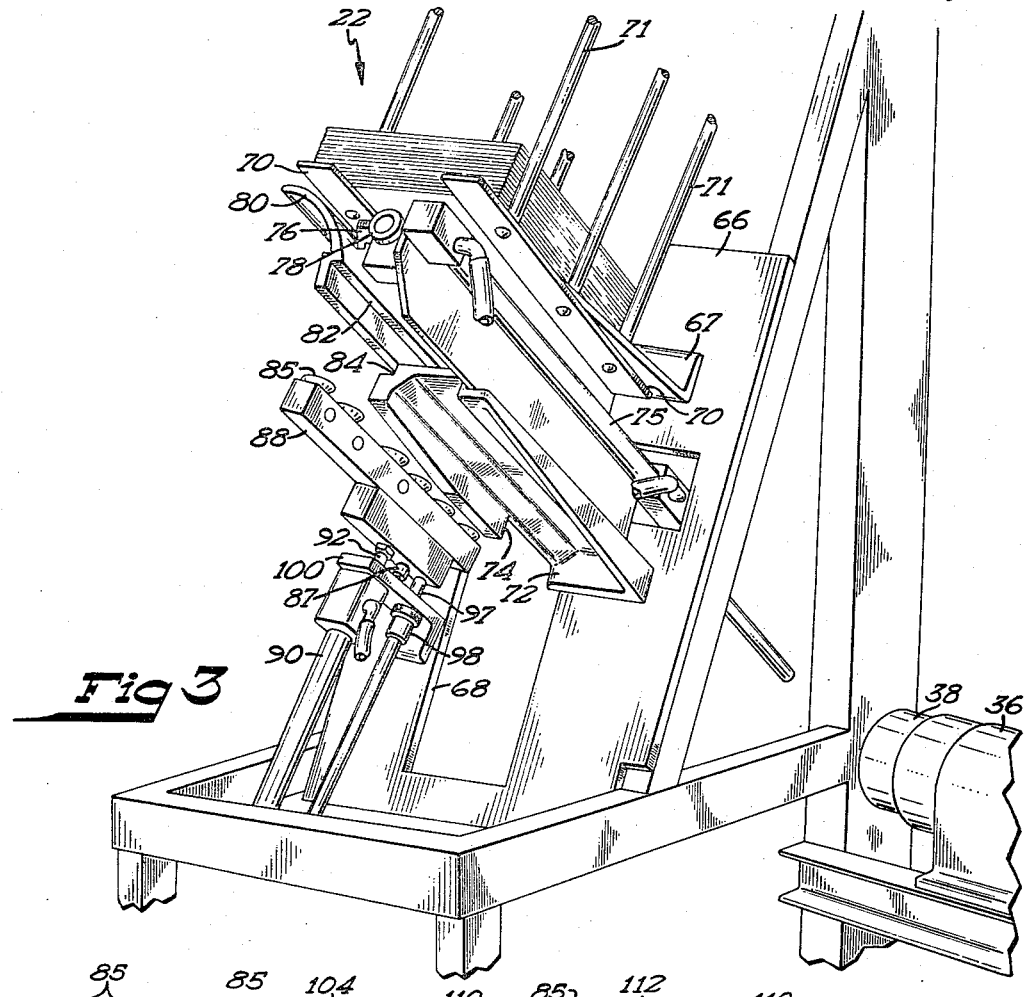
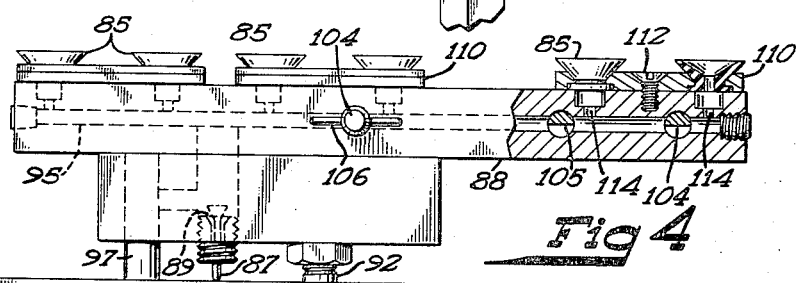
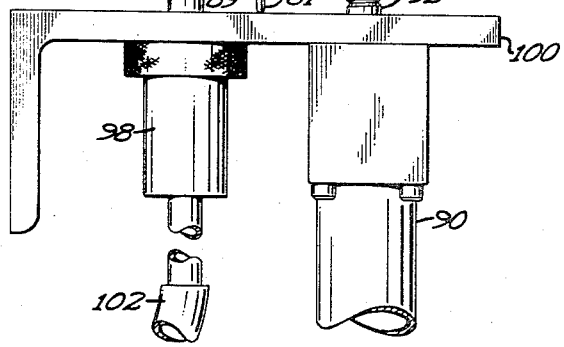

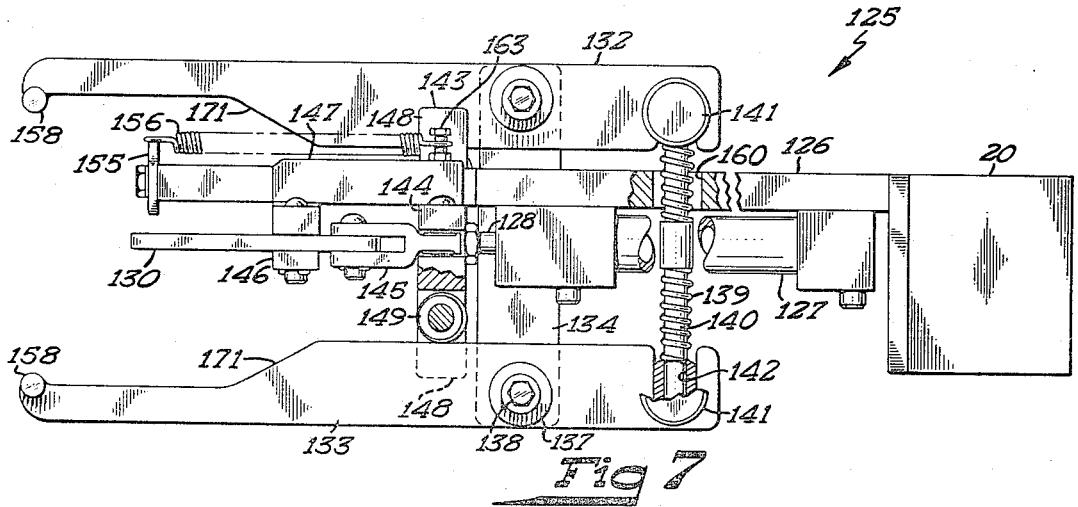
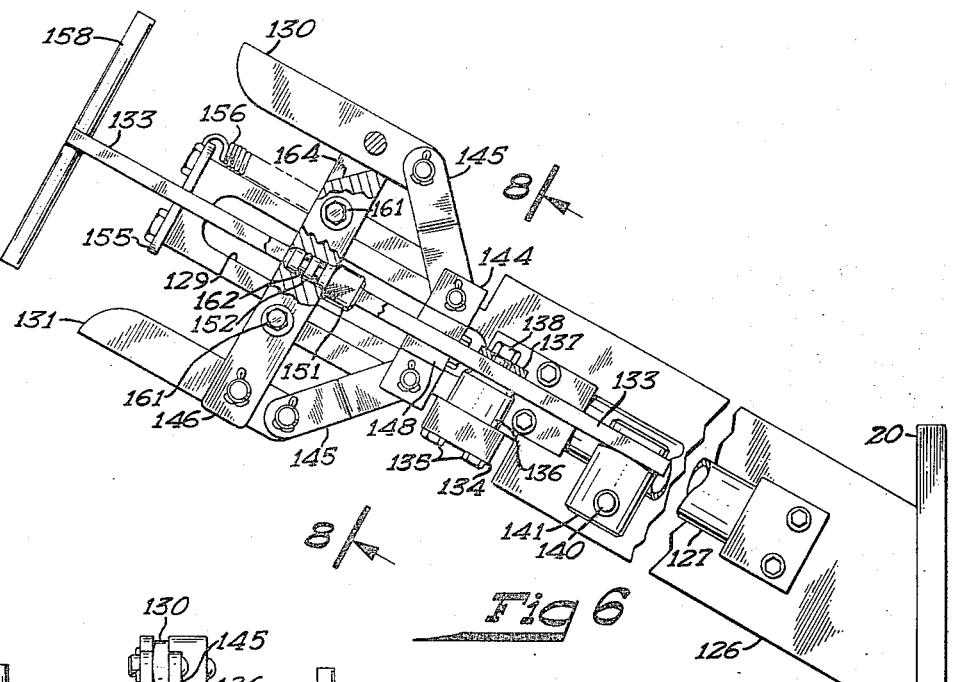
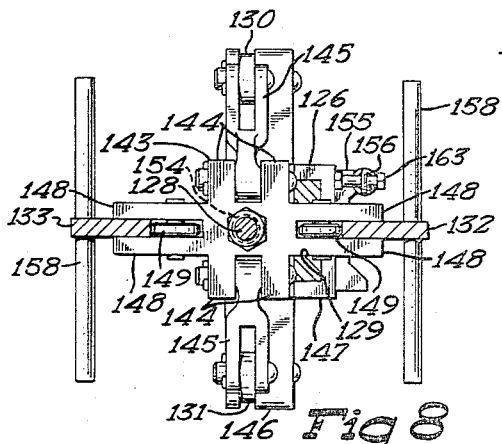

United States Patent Office 3,364,826
Patented Jan. 23, 1968

3,364,826
CARTON FORMING APPARATUS
Clarence G. Austin, Jr. and Howard R. Garrett, Woodstock, Ill., and Percy King, Bloomington, Minn., assignors, by mesne assignments, to Haskon, Inc., Wilmington, Del., a corporation of Delaware
Filed Sept. 27, 1965, Ser. No. 490,330
22 Claims. (Cl. 93—44.1)

This invention relates to carton forming apparatus and more particularly to an improved carton forming machine of the type which erects flattened carton blanks of varying sizes, such as is used in the milk industry.

Carton forming machines of this general type are known and in use. The prior machines, however, have been generally complex, large in size, and have not been adaptable to the forming of all of the various sized cartons used in the milk industry. Where machines of this type included provisions for handling several sized cartons, the changeover between sizes required extra equipment and such changeover was, in general, difficult and time consuming. Further, in prior carton forming machines, special provisions had to be made for completing the forming of the carton apart from the carton forming machine before the cartons could be used in filling and sealing machines. Such machines, in addition, are not readily adaptable for connection with filling and sealing machines as a combined unit without the requirement of special interconnecting and conveying apparatus.

The present invention is directed to an improved carton forming machine which meets the requirements of a generally universal carton size apparatus and is readily connectable with filling and sealing machines without the requirement of special apparatus. This improved carton forming machine includes mandrels upon which the cartons are formed which mandrels will accommodate most of the various sized cartons used in the milk industry. Further, the improved carton forming machine is compact and readily operated by a single operator. In addition the improved carton forming machine performs all of the carton forming functions such that the carton therefrom may be readily positioned or transferred to a filling and sealing machine without further preparation of the carton. As such, the improved carton forming and filling machine is an improvement over the prior patent application of Clarence G. Austin, Jr., and Howard R. Garrett, entitled, Carton Forming and Filling Machine, Ser. No. 405,530, filed Oct. 21, 1964, now Patent No. 3,307,325, issued Mar. 7, 1967. In addition the improved carton forming machine has a greater capacity or rate of carton forming and is readily interconnectable with a filling and sealing machine for synchronization with the operation of the same.

It is therefore an object of this invention to provide an improved carton forming machine.

Another object of this invention is to provide a carton forming machine which will handle most of the various volumetric sizes of cartons used in the milk industry.

A further object of this invention is to provide a carton forming machine which will discharge the various sized cartons in a proper position such that the machine may be readily interconnectable directly with a filling machine for filling and sealing of the cartons.

A still further object of this invention is to provie in a carton forming machine, apparatus which performs all of the forming and breaking functions on the cartons prior to transfer to a filling machine.

A still further object of this invention is to provide a carton forming machine which eliminates the need for special conveying apparatus between the carton forming machine and a filling and sealing machine.

Another object of this invention is to provide an improved carton forming machine which permits simplified change over for the various sized cartons used in the milk industry.

A still further object of this invention is to provide in a carton forming machine a simplified provision for carton conversion and rotation to position the formed carton in any desired position on the filling machine.

Another object of this invention is to provide in a carton forming machine a hydraulic drive apparatus with a clutch which permits maual rotation of the spindle for maintenance thereon.

These and other objects of this invention will become apparent from a reading of the attached description together with the drawings wherein:

FIGURE 1 is a perspective view of the improved carton forming machine connected to a filling and sealing machine.

FIGURE 2 is a side elevation view of the carton forming machine with the cover removed to disclose the relationship of parts;

FIGURE 2a is a sectional view of a portion of the carton forming machine taken along the lines 2a—2a in FIGURE 2;

FIGURE 3 is a perspective view of the carton blank dispenser and erection apparatus of the improved carton forming machine;

FIGURE 4 is a side elevation view of a portion of the erecting apparatus of the improved carton forming machine;

FIGURE 5 is a side elevation view of a mandrel of the improved carton forming machine;

FIGURE 6 is a side elevation view of the bottom flap pre-break apparatus of the improved carton forming machine;

FIGURE 7 is a plan view of the bottom flap pre-break apparatus of the improved carton forming machine;

FIGURE 8 is a sectional view of the pre-break apparatus of FIGURE 7 taken along the lines 8—8 therein;

FIGURE 9 is a perspective view of the flap heater of the improved carton forming machine;

FIGURE 10 is a perspective view of the bottom sealing press and top flap pre-break mechanism of the improved carton forming machine;

FIGURE 11 is a plan view of the apparatus of FIGURE 10;

FIGURE 12 is a sectional of a portion of the top flap pre-break mechanism of FIGURE 11 taken along the lines 12—12 therein;

GENERAL DESCRIPTION

Figure 13:
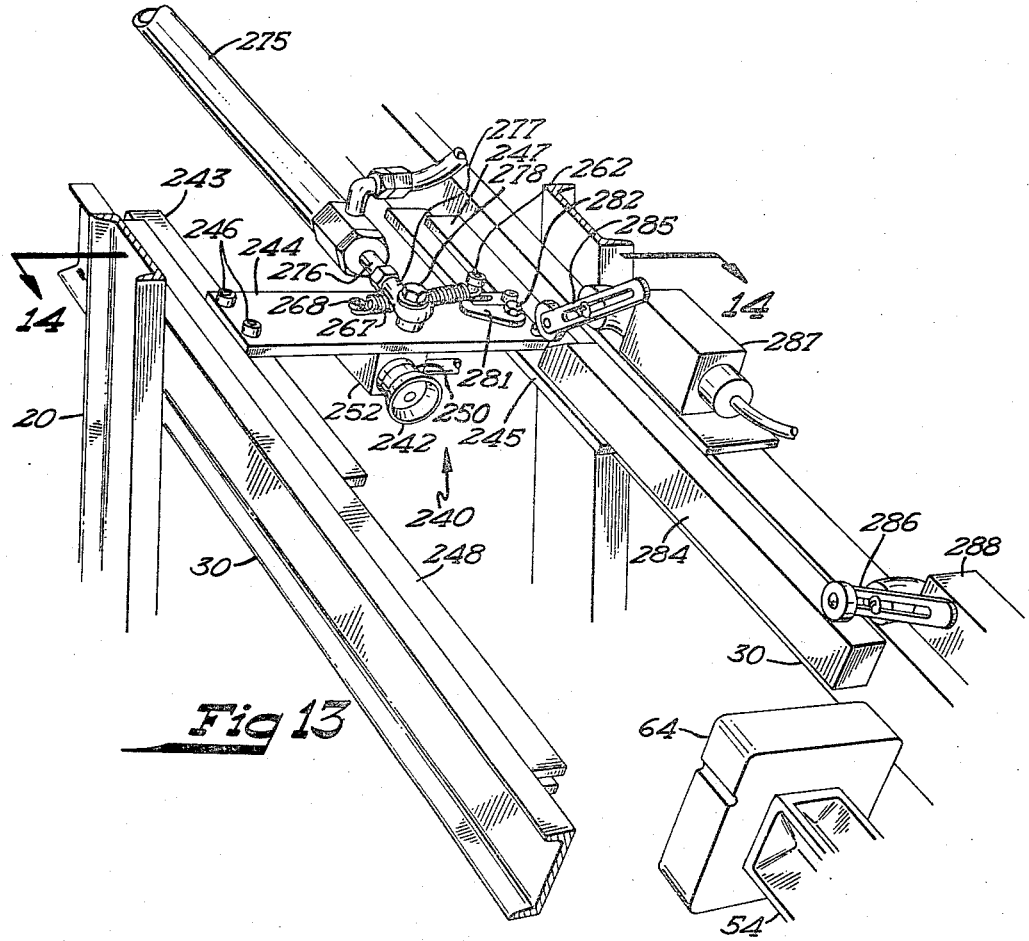
FIGURE 13 is a perspective view of the carton removal apparatus of the improved carton forming machine.

The improved carton forming machine of the subject invention provides a simplified and compact arrangement of parts by means of which carton blanks in a flattened form are transformed to a completed carton ready for immediate transfer to a filling and sealing machine which may be synchronized in operation therewith. This improved carton forming machine is provided with means for performing carton blanks of the milk carton type for the various sizes ranging from the one-half pint to the half-gallon capacity, the carton being of the thermoplastic coated paper type. The present machine is an improvement over that shown in the patent to M. A. Terry, No. 3,064,542, dated Nov. 20, 1962, and in the patent to H. R. Garrett et al. No. 3,307,325, dated Mar. 7, 1967, referred to above. With the present carton forming machine, various sizes of cartons are formed on the same mandrel structures which are provided with means for accommodating and the forming of various sized cartons through a simple interchange and repositioning of parts and with a minimum of modification to the forming equipment associated therewith. Thus the improved carton forming machine requires a minimum amount of time and equipment for change over in the forming of various sized cartons. Further, the improved carton forming machine utilizes an improved carton flap heating arrangement and positioning of the same which facilitates the heating of the carton flaps so that they may be prepared for sealing in a relatively short period of time such as to substantially increase the capacity of carton forming of the machine. In addition, the improved carton forming machine includes a simplified and accurate apparatus for pre-breaking the top and bottom flaps of the carton to improve the forming operation, and it positions the carton at the discharge end of the carton forming machine so that the carton may be directed into a filling and sealing machine directly without further conveying or positioning apparatus. The improved machine physically reduces the amount of space requirements for the carton forming and filling machines in that it may be positioned in direct contact with a filler and sealer machine to minimize the amount of floor space required for this equipment. The improved carton forming machine utilizes a plurality of mandrels positioned radially on a spindle mounted in a frame for movement about a horizontal axis, the spindle with the mandrels surrounding the same being rotated in a vertical plane and in a stepped sequence. A plurality of work stations used in the forming operation are positioned in the frame about the rotary path described by the mandrels, and the complete carton forming function takes place in a minimum amount of space and with a minimum amount of equipment to provide a complete forming and conditioning of the carton for use in a filling and sealing machine. Thus the improved carton forming machine utilizes an apparatus for carton blank removal from a storage container, the erection of the carton and placing the same on the mandrel, the conditioning of the carton on the mandrel by pre-breaking the bottom flaps of the same, and heating the bottom flaps by a heater positioned at the lowermost portion of the travel of the mandrels such that a maximum efficiency is gained from the heater to quickly soften the thermoplastic coating thereon. Thereafter the bottom flaps are folded and sealed while an improved structure positioned at the bottom sealing press station and operated simultaneously therewith conditions the top flaps of the various sized cartons. This improved top flap break structure accommodates all sizes of cartons including the top flap structures of the smaller cartons as well as the larger sized cartons. The flap structure between such sizes of cartons differs such that the top flap break structure must be provided with an arrangement for adequately conditioning the top flaps of the carton before removal of the same for all sizes of cartons. Thereafter the carton is removed from the mandrel and because of the difference in the top flap arrangement for various sized cartons, the larger sized cartons must be rotated about their longitudinal axis 90 degrees before inversion such that they will be in a proper position for entrance into a filling machine.

While we have shown a filling machine in connection with the drawings, its details form no part of the present invention and is exemplary only of how the improved carton forming amchine may be positioned in closed proximity with the filling machine and how the cartons of the various sizes are so positioned on the entrance to the filling machine so that no further alteration in position need be made to the same. The improved carton forming machine may use flattened paper cartons of the type shown in the Egleston et al. Patent No. 3,120,335, dated Feb. 4, 1964 and entitled Container With Infolded Bottom Closure. Since certain details of the carton forming machine are for the most part conventional, these details are shown diagrammatically with certain mechanical aspects omitted for simplicity purposes.

SPECIFIC DESCRIPTION

Our improved carton forming machine shown generally in FIGURE 1 at 10 in combination with a filling and sealing machine, shown schematically at 12 in a perspective view, to show the normal relationship and locationing of a filling and sealing machine with respect to the improved carton forming machine. The details of the filling machine form no part of the present invention and it is shown in FIGURE 1 only to indicate that it may be located adjacent and in abutting relationship with the carton forming machine and preferably at an angle thereto with its conveying apparatus located adjacent the discharge of the carton forming machine, as will be later described, to receive cartons in the proper position and relationship for processing in the filling and sealing machine. The carton forming machine is shown in FIGURE 1 as enclosed by a suitable casing 15 with appropriate panels or doors therein which may be opened for inspection and maintenance purposes.

Figure 16:
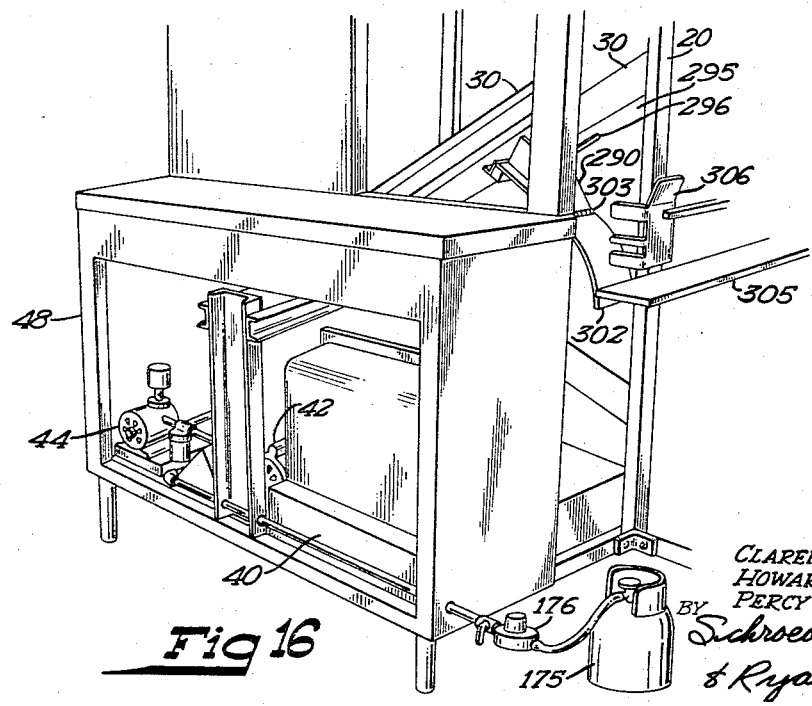
FIGURE 16 is a perspective view of the drive structure of the improved carton forming machine.

In FIGURE 2, the carton forming machine is shown in side elevation view with the casing 15 removed to disclose the frame 20 which is generally rectangular in form except for one corner of the same. This corner is removed to provide a mounting for the carton blank basket and erection structure, indicated generally at 22. Frame 20 is made of an angle iron or suitable material connected together by a means, such as welding, and has a pair of supporting legs 24 at the base thereof. It includes a centrally located support member 28 on either side of the same and suitable cross brace structures 30 connected to the center brace structure and the outer edge of the angle frame for the purpose of mounting the equipment between the sides of the frame structure. Frame 20 is upright or generally vertical and the center support members 28 on either side of the same mount a hexagonal shaped spindle 32 which is supported by a shaft (not shown) the ends of which are journaled in suitable bearing members 34 mounted in the center support members 28 and extending between the same, to provide a horizontal shaft arrangement for the spindle which is adapted to be rotated in a vertical plane. Spindle 32 is rotated on its supporting shaft through a suitable hydraulic motor 36 coupled to a speed reducer 38 (see FIGURE 3) which is energized from a hydraulic source. The hydraulic source is shown in FIGURE 16 generally at 40 as an enclosed type structure, it being understood that this will be a self-contained motor and pump with a sump and appropriate valving to supply fluid to the hydraulic motor 36 for rotating the same and, as will be hereinafter noted, to additional hydraulic actuators performing carton forming functions in the machine. For simplicity, the hydraulic lines are generally omitted, it being understood that suitable piping connects the self-contained and enclosed electric motor driven pump to the various actuators and motors to be driven thereby. The control lines where operated by appropriate valving, such as solenoid operated valving, will be specifically identified. The hydraulic source 40 together with a small air compressor 42 and an electric motor driven vacuum pump 44 are all mounted in a cabinet structure 48 suitably connected to the frame 20 and positioned at the back side thereof. This structure is conventional and the details of the same are eliminated for simpliciy.

Spindle 32, which is a built up structure of angle iron mounted on the shaft driving the same, mounts at its hexagonal peripheral surfaces six mandrel structures, indicated generally at 50. The mandrel structures eminate radially from the driving shaft on the spindle and are adapted to be moved in a vertical plane in a stepped arcuate or rotational movement of the spindle. Each of the mandrels are identical in structure and are shown and described in detail in the co-opending application of Clarence B. Austin, Jr., and Howard R. Garrett, entitled, Carton Forming Mandrel, filed Aug. 9, 1965, Ser. No. 478,111. The mandrel structures, are connected to the surface of the spindle 32 through suitable bolt means. One of the mandrel structures 50 is shown in plan view at FIGURE 5 as comprising generally a base 52 and an elongated body 54 having a slot 53 therein, the body being formed integral with the base 52 and being made of a metallic material. A composite shoulder or sleeve member 56 formed of a pair of halves connected together by a suitable connecting bolt 58 and slidably mounted in the slot 53 defines an upper shoulder against which the upper or top flaps of the carton blank are to be creased. The shoulder structure 56 has a second and smaller shoulder surface 60 against which the top gable flaps of the cartons for the smaller sized cartons are to be creased. The extremity of the body element 54 carries a circular headed member 62 upon which is adapted to be positioned an end cap 64 against which the bottom flaps of the carton are to be creased. The mandrel structures 50 accommodate various sized cartons from the half-pint size through the half-gallon size with the half-pint, pint and quart size being of a same cross-sectional dimension and of differing height or length and the half-gallon carton being of a larger cross-sectional dimension and of different length or height. An example of the type of carton employed will be found in the Egleston et al. Patent No. 3,120,335, dated Feb. 4, 1964 and entitled, Container With Infolded Bottom Closure. The end cap 64 will come in two sizes to accommodate the smaller and larger sized or cross-section cartons, the end caps being mounted on the circular end 62 of the mandrel by means of a cooperating recess in the end cap 64 and a suitable rubber sealing member 63 positioned therein to provide a fraction fit therebetween. The outer edges of the slidable shoulder halves which form a composite rectangular structure are of the same rectangular dimension as the larger end cap 64 for the larger sized cartons and the inner shoulder portion 60 thereon defines a similar rectangular shoulder section of the same size as the smaller end cap 64 and of the same cross-sectional dimension as the smaller sized cartons. The individual shoulder sections are adjusted on the mandrel bodies 54 by moving the sleeve members 56 relative to the body 52, this motion being guided by the connecting bolt 58 which connects the halves of the sleeve members 56 together and is positioned in the slot 53 in the mandrel body 54. Also mounted on the base 52 of the mandrel are projecting finger members 61 which are used for engaging the top gable flaps of the larger sized cartons for infolding the same, as will be later noted. Similar finger members 65 mounted on the sleeve members 56 perform the same function on smaller sized cartons. Each of the mandrel structures 50 on the spindle are identical in construction and mount the various sized carton blanks to be formed into various sized or volume cartons.

As will be seen in FIGURES 1, 2, and 3, the carton blanks which are fed into the carton forming machine are mounted in a basket structure positioned on a plate 66 and connected across the open corner of the frame 20. This plate mounts the bracket portion 67 of the basket structure and includes a slot or aperture 68 therein through which the erected cartons are directed onto the mandrels, as will be later noted.

As will be best seen in FIGURE 3, the structure for the basket includes a pair of spaced flange members 70 which expose a side surface of the carton blanks mounted in the basket and between the upstanding rods 71 of the same. Although not shown, it will be understood that the rods are adjustable in spacing to hold and guide in the basket various width carton blanks. Below the guide flange members 70 and alinged with the same is a support member 72 attached to plate 66 which mounts a carton edge retaining bracket 74 and an actuator 75 for a carton advance arm 76, the arm being slidably mounted on a shaft (not shown) positioned in a tubular support member 78 which is also mounted on the support member 72. On the opposite side of the opening between the supporting flanges 70 is a curved plate 80, also mounted on plate 66, which engages the side of the carton as it leaves the basket and erects or opens the same with one corner edge of the erected carton resting in a shoulder portion 82 of the curved plate 80 and the other being engaged by the notched portion 84 of the stop member 74. The cartons are moved from the basket and erected or opened to their square cross-sectional shape by means of a plurality of suction cups 85 positioned on a manifold 88 and moved toward and away from the basket by means of a second hydraulic actuator 90 whose shaft 92 connects to and mounts the manifold 88. The manifold 88 with the suction cups 85 thereon has a centrally located passage 95 (see FIGURE 4) which is connected to a hollow tubular guide member 97 journaled in a block 98 and mounted on a flange 100 attached to the base plate 66 on the frame 20. The manifold 88 is adapted to be connected to a vacuum line indicated at 102 of the flexible type which connects to the hollow tubular member 97 such as to place the passage 95 in the manifold under the influence of a vacuum pump to create a suction at the cups 85. The bracket 100 and the slide block or journaling block 98 mounted thereon slidably positions the tubular member 97 connected to the manifold, which also serves as a guide for the manifold in addition to supplying the source of vacuum thereto. Manifold 88 is vented to atmosphere to release the suction at the cups 85 and hence release the carton blank through a small valve 89 positioned in the manifold in communication with passage 95 and actuated by operation of a feeler member or stem 87 connected to the valve as the feeler engages flange 100.

Manifold 88 also has a plurality of valve members 104 connected thereto and a portion of the manifold is shown in section to disclose that the valve members are rods with passages 105 therethrough journaled in apertures in the manifold and having operating handles 106 connected thereto such that the rods may be rotated to open and close the passage to various suction cups. The individual suction cups are held in position on the manifold by means of a removable plate 110 connected thereto by screws 112 which position the cups over ports or passages 114 in the manifold connected to the main passage 95 therein. The various suction cups along the extent of the manifold are adapted to be disconnected from the passage 95 by rotation of the handles 106 of the valve members 104 to a position where the port 105 through the movable valve member is positioned across rather than aligned with the extent of the passage. The purpose of the valves are to isolate various suction cups from operation of the smaller sized cartons. Thus with the manifold as shown in FIGURE 4, all of the suction cups will be connected directly to the main vacuum passage 95 and with the smaller sized cartons extending from the half gallon down through the smallest sized carton, the various valves will be selectively operated to cut off the respective suction cup positioned on the opposite side of the same from the inlet tube 97. In this manner the suction cups will not be exposed directly to the atmosphere when smaller sized cartons are used so as to cause an air bleed into the vacuum line and reduce the effectiveness of the remaining suction cups in the opening or erection of the carton blanks from the basket. Thus for various sized cartons, the appropriate number of suction cups will be connected to the vacuum line or passage 95 in the manifold such that the respective cups exposed thereto will engage the exposed surface of the carton between the spaced flange members 70 and draw the same from the bottom of the pile, opening the carton blank by urging it against the curved plate 80. At the time the carton reaches the position where its diametrically opposed edges are engaged with the shoulders grooves or stops 82, 84 in the plate 80 and stop members 74 respectively, the vacuum line 102 is opened to atmosphere releasing the carton and permitting the manifold to move under the influence of the actuator 90 away from the same in a retracted position for the actuator 90. Where smaller sized carton blanks are used, the distance between the stops 82, 84 are decreased by shifting the respective members to accommodate the smaller cross-sectional areas or forms of the smaller sized cartons. When the carton blank is held in position between the respective shoulders on the guide and stop flanges respectively, the actuator 75 is actuated and its operating shaft (not shown) connected to a sliding shaft carrying the arm 76 is moved such that the arm engages the exposed or outer edge of the carton and advances it onto the mandrel positioned in alignment therewith. Suitable solenoid valve structures connected respectively to the vacuum line 102, the actuators 75 and 90 and controlled by limit switches, to be hereinafter identified, control the operation of the erection apparatus in the withdrawal of a carton blank from the basket and the opening of the same as it engages the curved plate 80 bringing it to rest against the stop bracket 75 and the shoulder portion 82 of the curved plate. Thereafter the arm 76, which is moved by the actuator 75, will advance the carton blank onto the mandrel with the edges of the carton being guided in the grooves of the stop members 74 and the plate 80. The actuator 75 moves the carton blank the proper distance such that the bottom fold flaps of the carton are positioned adjacent the end face of the mandrel end cap 64 and such that a bottom flap break structure may operate to bend the bottom flaps of the carton along their preformed fold or score lines.

Thus as will be seen in FIGURES 6, 7, 8 the next station or forming apparatus mounted on the frame 20 is the bottom flap pre-break mechanism shown generally at 125.

The bottom breaker assembly is mounted on an elongated plate 126 attached to the frame 20 of the carton forming apparatus, the plate mounting on one surface thereof a hydraulic actuator 127 for the breaker assembly. The actuator 127 has its operating shaft 128 connected to the parts of the breaker assembly, to be hereinafter identified, for the purpose of operating the same and a slot 129 positioned in the free extremity of the plate 126 serves as a guide for a portion of this apparatus. The breaker assembly includes a pair of inner finger members 130, 131 which operates with a scissors type action to engage the infold flaps of the carton blank to deflect the same and bend the bottom infold flaps along the score lines thereon. An outer pair of flap engaging members 132, 133 included in the breaker assembly alos engage the bottom fold flaps of the carton blank in a stepped sequence with the before mentioned finger members and operate with a similar scissors action to deflect or bend the outer fold flaps of the bottom of the carton blank to crease the same along the score lines. The action of the latter flap engaging members is in a plane normal to the plane of operation of the finger members 130, 131, such that the flaps engaging members and fingers engage sides of the carton on opposite surfaces thereof. The outer flap engaging members 132 and 133 are identical in form and are elongated levers which are pivotally mounted at the extremities of a transversely extending plate 134 attached to the elongated plate 126 midway along its extent and suitably secured thereto through screw means 135. The lever like members 132, 133 are pivotally mounted in bearing blocks 136 attached to the extremities of the mounting plate 134 and are retained thereon through bearing washers 137 and bolts 138 which extend through the washer and bearing blocks being threaded into the extremities of the mounting plate 134. The pivot point for the flap engaging members is intermediate along the extent of the same and the extremities of the flap engaging members remote from the mandrel with the carton blank thereon are biased apart through springs 139 which are positioned on a shaft 140 extending between the ends of the flap engaging members and being mounted at its extremities in spring retaining members 141 in holes 142 therein. The spring retaining members are suitably attached to these extremities of the flap engaging members for pivotal movement thereon and the shaft 140 extends through the aperture 160 in plate 126 inasmuch as the flap engaging members are positioned to either side of the mounting plate 126. The action of the springs 139, which are of the compression type, is to bear against or urge the ends of the flap engaging members 132, 133 apart causing the same to pivot about their mounting on the pivot members 136 such that the opposite extremities of the flap engaging members come together in a scissors action in the vicinity of the extremity of the mandrel and in contact with the flaps of the carton blank mounted thereon. Such action will best be seen in the plan view of FIGURE 7 for the bottom breaker assembly.

The flap engaging members 132, 133 are normally held apart in spaced relationship against the action of the springs 139 bearing against the extremity of the same by the operation of a cruciform shaped yoke 143 which mounts at flanged extremities 148 of the same, roller members 149, the roller members bearing against the inner edges of the engaging members to hold them separated. As will be hereinafter noted, the yoke 143 with the rollers thereon moves relative to the flap engaging members to permit movement of the same. The cruciform member or yoke 143 has a second pair of flanged extremities 144 positioned normal to the extent of the flanged extremities 148 mounting the rollers 149. These extremities pivotally mount linkage members 145 which pivotally connect to the fingers 130, 131 at their opposite extremity. The fingers 130, 131 are in turn supported by a translationally extending support member 146 which pivotally mounts the fingers 130, 131 in bifurcated extremities of the same. A cruciform member or yoke 143 in addition has a tapped aperture therein into which the shaft 128 of the actuator extends and is coupled through suitable threading and a lock nut 154 as shown in FIGURES 6 and 7. Inasmuch as the actuator 127 is mounted to one side of the plate 126, the cruciform yoke member 143 will be mainly positioned to one side of the same and one of the flanged extremities 148 will project through the slot 129 in the plate for positioning its roller in contact with the respective flap engaging member. Similarly, the bifurcated support member 146 which pivotally mounts the fingers 130, 131 is supported by a guide block 147 which is channel shaped in form and is positioned around the edges of the plate 126 having the slot 129 therein to attach to the support member 146 through suitable bolt means 161. This slidably mounts the support member on the extremity of the plate 126 and aligns the member with the axis of the hydraulic actuator 127 on the opposite surface of the plate 126. In addition the support member 146 has a hole 152 centrally located therein and aligned with the axis of the shaft 128 and actuator 127 in which is positioned a stop member 151 the stop member being adapted to be engaged by the cruciform yoke 143 as it is moved by the actuator to pivot the links 145 and hence the fingers 131, 132 in the scissors type operation. Suitable "O" ring members 162 mounted thereon frictionally position the stop member 151 in the hole 152 so that it can be removed therefrom in the adjustment of the bottom breaker assembly for various sized cartons. The extremity of the plate 126 mounts a spring retaining flange and stop member 155 at the end of the same, the stop member having a portion projecting into the path of movement of the support 146 as it is guided by the guide block 147 on the plate 126 for an ultimate limit of movement of the support member along the extent of the plate. The spring retaining flange 155 mounts a coil spring 156 which is attached at its opposite extremity to a spring retaining stud 163 mounted in the extremity of the guide block 147. This places a spring bias action between the plate and guide block urging the support member 146 connected thereto toward the free extremity of the plate. Such action is limited or controlled by virtue of the connection of the shaft 128 of the hydraulic actuator to the cruciform yoke 143. The actuator 127 is positively actuated in both directions and will counteract the action of the tension spring 156 and hold the fingers and the support member in a predetermined or inactive position whenever the actuator 127 is so energized such as to have the shaft 128 within the confines of the same. Opposite energization or application of fluid pressure to the actuator 127 to move the shaft out of the confines of the actuator will urge the cruciform member toward the left as seen in FIGURE 6 allowing the spring to similarly move the support member 147 and hence the fingers 130, 131 mounted thereon toward the direction of the mandrel. As the yoke 143 moves in this direction, it will deflect the free extremities of the fingers through the linkages 145 toward one another in a scissors type action. The degree of this pivotal movement of the fingers 130, 131 is limited for the larger sized carton blanks by the presence of the stop member 151 in the support 146 which is engaged by the cruciform member after a predetermined travel of the same through movement of the actuator shaft. For smaller sized carton blanks, a greater degree of pivotal or scissors movement is required for properly scoring or bending the infold flaps of a carton blank, and hence the stop member 151 is removed from the hole 152 as shown in FIGURE 6 and positioned in the opposite end of the hole so as not to be contacted by the cruciform member. With this degree of adjustment, the pivoted fingers 130, 131 on the support member 146 will move until they engage cam surfaces 164 in the bifurcated extremities of the support member which services will limit the degree of pivotal movement on scissors action of the fingers 130, 131. As the cruciform yoke 143 is moved with energization of the actuator toward the end of the plate 126, the rollers 149 riding on the inner surfaces of the levers or flap engaging members 132, 133 will engage cam surfaces 171 on the levers or flap engaging members 132, 133, permitting the ends of the levers or flap engaging members 132, 133 to come together in a scissors type action. The free extremities of the flap engaging members mount transversely extending rods 158 which engage the outer fold flaps of the bottom of the carton as the flap engaging members are allowed to come together with movement of the rollers on the cruciform member into the area of the cam surfaces 171. The actual step function performed by the bottom breaker will be such that the infold flaps of the carton blank will first be engaged through pivotal movement of the fingers 130, 131 with operation of the actuator in a predetermined direction after which the outer levers or flap engaging levers 132, 133 will come together to deflect the outer portion of the bottom carton flaps with a bending operation to condition the bottom of the carton blank for heating and sealing. A reversal in the operation of the actuator 127 withdrawing its shaft 128 will reverse the operation of the bottom breaker assembly to raise the fingers 130, 131 and flap engaging members 132, 133 clear of the carton blank and retracted along the plate 126 such that the assembly may receive and be clear of additional carton blanks mounted on the mandrels of the spindle as the same is rotated in a stepped type of operation.

The next station on the frame 20 to act on the carton blank position on the mandrel as it is rotated in stepped movement on its journaled axis is the heating station shown generally at 165, in FIGURE 9. The improved carton forming machine utilizes a gas burner 166 positioned on an angle bracket 167 which is mounted on a shaft 168 slidably positioned in a slot 169 in the center support 28 of the frame 20. The gas burner has a gas jet igniter 170 for igniting the same which is connected to a pipe 172 leading to a regulated source of gas supply indicated by the bottle 175 and regulator 176 in FIG. 16. Also connected to the burner is an air tube 180 which is connected to and set by the compressor 42 in the back cabinet 48 of the mounting frame. The spark igniter is supplied from a suitable source at a control in the control circuit to be hereafter identified. The burner 165 is positioned below the axis of rotation of the spindle 32 and in alignment of the mandrels in the vertical position such that the maximum conduction of heat from the burner will be effected on the exposed extremities of the bottom flaps of the carton blanks mounted on the mandrels which are adapted to be moved in stepped rotation in near proximity therewith. The gas supply provides a very rapid source of heat which effectively tempers or softens the thermoplastic coating on the carton blanks to substantially reduce the heating time in the carton forming operation. The burner 165 is shown only generally in that it is a conventional unit, and it is positioned in the carton forming machine on the frame 20 in the most advantageous position for the effective heating of the carton flaps. The shaft 168 which positions the burner toward and away from the ends of the mandrel is clamped in the center support structure 28 by means of a handle 182 having a threaded aperture (not shown) adapted to be threaded on to the similarly threaded extremity (not shown) of the shaft 168. A suitable flange, indicated in phantom at 184, on the inside of the center support structure permits the handle to clamp the shaft 168 in a desired position or elevation on the support member with respect to the ends of the mandrel for most effective heating of the exposed carton flaps above the same. The heating effect of the burner 165 is improved, if desired, by the use of a closed tubular member 181, shown in phantom connected to the air tube 180 and positioned above the burner by a bracket suitably attached to flange 167. The tubular member 181 has apertures 183 along the extent of the same and directed toward the center of the burner to deflect the flames therefrom toward the carton blank above the burner.

After the carton flaps on the bottom of the carton are softened or the coating thereon is tempered preparatory toward sealing of the carton, rotation of the carton blank through movement of the spindle 32 with the mandrel thereon will cause the bottom flaps of the carton to engage guide folding rails 185 (see FIG. 2) positioned on either side of the carton and connected to the frame through brackets 186. These rails converge as they approach the next work station which is the sealing press and top flap pre-break station, indicated generally at 190.

The bottom sealing structure, as will be seen in FIGS. 2 and 10, are mounted on the frame 20 through cross braces 192 which extend between the internal framing 30 and mount the press actuator 195. The press plate 196 includes internal passages (not shown) connected to the ports 198 on the sides thereof to permit cooling water to be connected through the press head through flexible tubing such as indicated at 199. The shaft 200 of the actuator 195 mounts the press plate 196 which structure is also guided by means of shafts 202 journaled in guide members 203 mounted on the cross supporting flanges 192. The plate 196 is adapted to move with operation of the actuator along the axis of the mandrel and toward and away from the same. The folded bottom flaps which are guided to the folded position by means of the rails 185 will be engaged by the press and pressed against the end of the end cap 64 on the mandrel to seal the bottom of the carton. Cooling water flowing through the press plate will cool the heated flaps to increase the efficiency of the sealing operation.

Also mounted at the station 190 is a top break structure which includes a pair of break flap actuating assemblies 205, 206 positioned on either side of the mandrel to engage the top flaps of the carton blank which are positioned on the mandrel adjacent the mounting end of the same. The flap break assemblies 205 and 206 are identical in structure and each include a pivoted flange member 207 and 208 respectively pivotally moved through operation of respective actuators 209 and 210 connected thereto. Since these structures are identical in form, only one will be described in detail, it being understood that the other has the same parts and functions in the same manner. Thus, as will be seen in FIGURES 10 and 11, each flap break assembly includes a guide flange 211 mounted on the transversely extending and inner support members 30 of the frame 20 through suitable bolt means 212. Positioned on each guide flange is an elongated guide member 213 which is similarly connected to the guide flange by means, such as bolts 212. The guide member has a ribbed portion 214 or surface which, as will be later noted, aids in the clamping and guiding of the flap break assemblies. The guide member mounts a platelike support 215 with a recessed under surface 220 which fits over the guide member and is slidably mounted thereon. On the exposed surface of the plate, the respective actuators 209 or 210 are mounted, each actuator having a flanged extremity 216 which connects or mounts on a pivot pin 229 and is retained thereon by a suitable key 222. Similarly, the flange or platelike members 207 or 208 are pivotally mounted on the opposite extremity of the plate 215 through a suitable pivot connection indicated at 218, the plates having a bifurcated extremity 219 beyond the pivotal mounting 218 which is connected through a suitable coupling member 221 to the shaft 217 of the respective actuators. Each of the platelike members at their free extremity have a beveled or tapered extremity which, as will be later noted, are adapted to fit into the infold flaps of the carton blank for creasing or bending the same. The plates 215 are secured on the guide member 213 by means of an elongated clamping plate 223 which is positioned in the recess 220 of the plate between the guide flange 211 and the upper surface of the plate 215 with a lip portion which extends under the rib 214 of the guide member. A suitable threaded aperture 224 in the clamping plate receives the threaded extremity 235 of a clamping bolt 226 which extends through an aperture 225 in the plate and has a shoulder portion on the upper surface of the plate to aid in clamping the plate between the plate 215 to the guide member 213. The clamping bolt has a suitable handle portion 228 for rotating the same and the guide plate is thus slidably mounted on the guide member positioned on the guide flange 211 to slidably mount the plate and hence position the pivoted plate members 207, 208 relative to the mandrels mounted on the spindle for varying sized cartons. Operation of the actuators 209 and 210 in such a direction as to withdraw their respective shafts into the confines of the actuator will cause pivotal movement of the flanges or plates 207, 208 toward the mandrel and the carton thereon. The surface of the pivoted plates 207, 208 are adapted to engage the top flaps of the carton blank on the mandrel to pre-bend a surface of the same on either side of the mandrel. The actuators 209 and 210 are energized simultaneously to the same degree and in the same direction such that the plates will be pivoted from either side of the mandrel toward the same to effect the bending of the top flaps of the carton simultaneous with the sealing of the bottom flaps of the carton or shortly thereafter. The mandrels include deflecting fingers 61 thereon at the base of the same which engage certain of the flaps in the larger sized carton to deflect the same, these fingers being positioned to engage portions of the carton flaps not engaged by the pivoted flap members or plate members 207, 208. Similar deflecting fingers 65 on the sleeve of the mandrel perform the same function for these smaller sized cartons. In the smaller sized cartons, that is the half pint, one-third quart, pint and quart cartons which are all of the same cross-sectional dimension and differ only in length, the infold flaps are rotated 90 degrees from the infold flaps on the bottom of the carton. This is peculiar to the construction of the carton. In the larger sized carton, that is the half gallon carton, the infold flaps are aligned at both ends of the carton blank. Thus the top break assembly will in the case of larger sized carton engage the outer position or flap at the top of the carton since this is the manner in which the carton is positioned on the mandrel. The infold flaps will be engaged by the fingers 61 and the triangular or taper form of the plates 207 and 208 will engage the outer top flaps of the gable top carton to crease the same along the scorelines with the inner flaps being folded by virtue of their partial deflection as caused by the fingers 61. In the smaller sized cartons, the infold flaps at the top of the carton are engaged by the pivoted flap members or plate members 207, 208 and the tapered or generally triangular extremity of the platelike members will fit in the infold flaps for the smaller sized cartons to crease the same along the fold line and draw the outer flaps in as the inner flaps are creased. The shoulder portions of the sleeve members on the mandrels cooperate with this creasing action to crease the top flaps of the carton along the scorelines such that further preparation of the carton is not necessary for filling and sealing. This is true of all carton sizes. Adjustment of the top flap break assemblies will be effected by loosening of the clamping bolt 226 from the clamping plate 223 and sliding the plate assembly with the actuator and pivoted plate members 207, 208 thereon along the guide member 213 to a desired position relative to the carton blanks mounted on the mandrels. Indicia for readily locating such positions may be included on the guide flanges 211, if desired.

Figure 14:
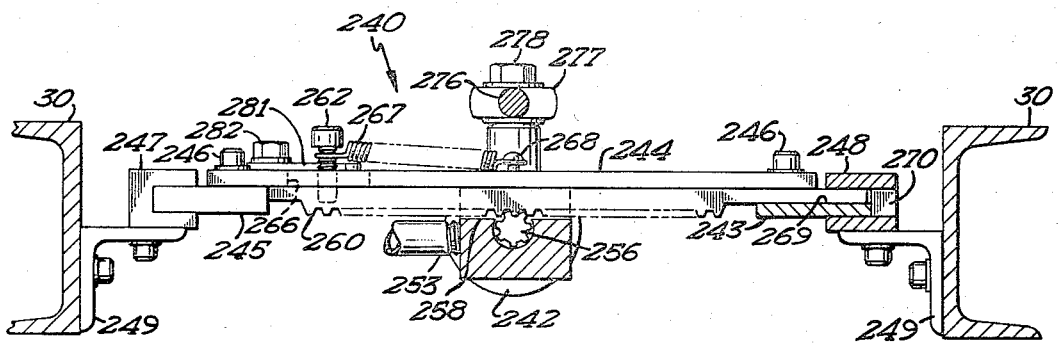
FIGURE 14 is a sectional view of the apparatus of FIGURE 13 taken along the lines 14—14 therein.

After the individual mandrels leave the bottom press or seal and top pre-break station 190, they are moved in a stepped movement to the carton removal, rotation and inversion station, indicated generally at 240 in FIGURES 13 and 14. At this station, a suction cup 242 is moved toward and away from the end of the mandrel to engage the bottom of the carton and remove the same therefrom releasing the carton for inversion at the discharge end of the carton forming machine, as will be hereinafter identified.

In FIGS. 13–14, the carton removal apparatus is shown as a plate structure 244 connected to a pair of sliding plate members 243, 245 through suitable bolt means 246, the plate members 243, 245 being guided in channel members 247, 248 (best seen in FIG. 14) which channels are mounted on angle brackets 249 secured to the internal framing 30. Suction cup 242 is mounted on or carried by a hollow cylindrical member 250 which is journaled in a block 252 connected to the plate structure 244 and movable therewith. An internal passage (not shown) in block 252 connects with the interior of member 250 and cup 242 to supply vacuum pressure to the cup with a pipe connection 253 in block 250 leading to the vacuum lines. A portion of the vertical surface of the cylindrical member 250 has a geared surface 256 formed thereon and the block 252 is recessed as at 258 to permit a rack member 260 to move through the block and engage the surface 256 of the cylindrical member 250. Rack 260 has a pin or bolt member 262 threaded into the same and positioned in a slot indicated at 266 in the plate 244 to permit the bolt 262 to move within the slot as the rack 260 is moved relative to the plate 244. A bias spring 267 is connected to the bolt 262 at one extremity and fixed to the plate 244 through a bolt 268 to secure the other extremity of the spring applying a bias to the rack 260 through the bolt 262. The rack 260 in addition to being guided in the recess or slotted portion 258 of the block 252 also is slidably mounted in a slotted portion 269 in the plate members. Similarly, the channel member 248 has a wedge shaped slot or groove 270 therein which provides a cam surface to cooperate with the end of the rack and permit the rack to move to the right, as viewed in FIG. 14, as the rack 260 is moved past the grooved portion 270 in the channel member 248. Such movement will be directed under the influence of the spring 267 applied to the pin 262 and connected to the rack 260 to cause rotation of the cylindrical member through the geared surface 256 on the cylinder and the cooperating cylinder toothed surface on the rack to rotate the suction cup 240 on the cylindrical member 250. The plate 244 is moved by means of the actuator 275 whose shaft 276 is connected by means of a linkage 277 to the plate through a bolt 278. The opposite extremity of the cylindrical member is connected to the frame 20 at an extension 280 thereof (see FIG. 2). The groove or slot 270 is positioned in the channel member 248 near the end of the travel of the plate 244 as the piston in the actuator 275 is retracted drawing the shaft 276 into the confines of the actuator. This will be the period of time in which the suction cup has removed the carton from the mandrel. As the cam surface 270 is approached, the rack will slide to the right as viewed in FIG. 14 rotating the suction cup 90 degrees to rotate the carton connected thereto before it is released from the suction cup by release of the vacuum applied thereto. As will be seen in FIG. 13, the pin 262 is adapted to be engaged by a pivoted latch member 281 which is connected to the plate 244 by means of a bolt 282. The latch member when moved to engage the pin 262 will prevent the rack from moving as the cam surface is passed by the rack in the travel of the plate members 243, 245 in the channel members 247, 248. Also mounted on the channel member 245 is an elongated cam surface or member 284 which is adapted to be engaged by followers 285 and 286 respectively, the followers operating limit switches 287 and 288 to control the operation of the actuator 275 and the valving associated with the vacuum line supplying the suction cup 242.

In the operation of the carton removal mechanism, the actuator 275 advances the plate assembly 240 and plate members 243, 245 within the channel members 247, 248 toward the end of the mandrel. As the suction cup engages the bottom of the sealed carton, vacuum applied thereto will cause the carton to adhere to the suction cup and the entire assembly with the carton thereon is moved within the channel members 247, 248 as the actuator is reversed in its direction of movement. Depending upon whether the latch 281 is in engagement with the pin 262 or not, the carton may be rotated 90 degrees as the rack 260 passes the groove or slot 270 in the channel member 248. In the case of the larger sized cartons, where the fold of the top flaps of the carton are such as to be 90 degrees displaced from a normal position for entrance into a filling and sealing machine attached to the former, as shown in FIGURE 1, the carton is rotated through 90 degrees to properly align the infold flaps in a desired position at the time it is released. Since the small sized cartons vary in their top flap arrangement with respect to the large cartons, and depending how the filling machine is connected to the discharge end of the forming machine, one or the other size may have to be rotated to properly place the respective carton on the filling machine for filling and sealing. Where rotation of the carton is necessary, the latch 281 is released allowing the pin 262 to move in the slot 266 and permit the rack to rotate the cylindrical member 250 carrying the suction cup 242 to rotate the carton connected thereto. As the cam follower 285 engages the surface of the cam 284 indicative of the end of travel of the actuator 275, the vacuum line is conditioned or a valve associated therewith is actuated to release the vacuum on the suction cup releasing the formed carton blank and permitting it to fall.

Figure 15:
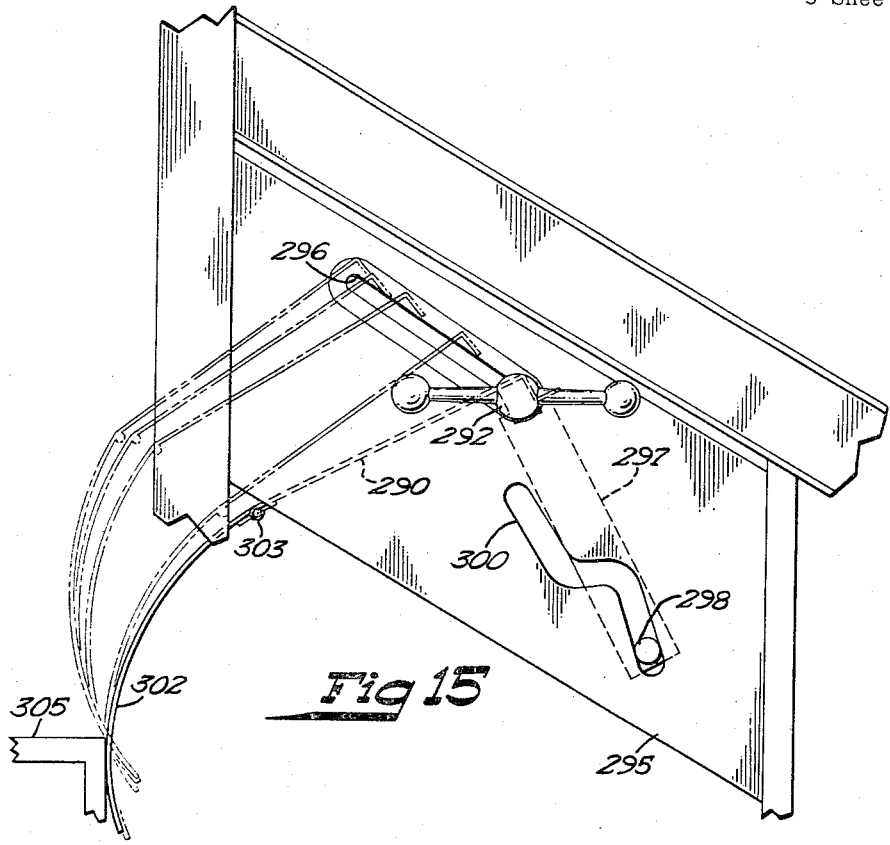
FIGURE 15 is a side elevation view of the adjustment structure of the carton inverting apparatus of the improved carton forming machine.

The carton or formed blank, after it has been released, falls and engages a plate 290 extending across the width of the frame 20. The plate 290 is carried or mounted at one extremity by a shaft 292 slidably mounted in a plate 295 attached to the frame of the machine. Shaft 292 extends through a slot 296 in the plate 295 and has connected thereto a rod or plate member 297 with a pin 298 in its lower extremity which extends through a second slot 300 in the plate 295 to guide the shaft 292 and hence the upper extremity of the plate 290 with respect to the frame. Plate 290 forms the discharge mechanism for the forming machine and is adjustable to accurately invert various sized cartons. The plate 290 has a curved platelike member 302 connected thereto through a spring biased connection 303, and the surfaces of the plate 290 and member 302 provide a surface onto which the carton is dropped and inverted so as to be standing upright as it leaves the forming machine. Normally the discharge end of the forming machine is positioned adjacent a filling machine, such as is indicated in FIGURES 1, 2 and 16, so that a conveyor base, indicated at 305, of the filling and sealing machine will be located adjacent the curved plate member 302 to be contacted thereby. The carton as it engages the plate 302 in the upright position will be in a position to be engaged by the conveying or transfer mechanism, indicated at 306, which forms a part of the filling and sealing machine. The rod 292 which mounts the end of the plate 290 is moved in the slot 296 with the pin 298 connected to the plate 297 moving in the slot 300 in such a manner that the angle that the plate 290 makes with respect to the frame will properly engage the carton to insure that it slides out of the forming machine in an upright position. For the larger sized cartons, the plate 290 would be in the position as shown in FIGURE 15 with the plate being elevated to a more acute angle with respect to the frame for the smaller sized cartons. The spring biased curved member 302 connected thereto insures that the carton as it is engaged will be maintained in its upright position as it reaches the conveying surface of the filling machine. Thus the plate 290 and member 302 together with their adjustment mechanism insure positioning of the carton in an erected position on a conveying machine or at the discharge end of the forming machine.

Figure 18:
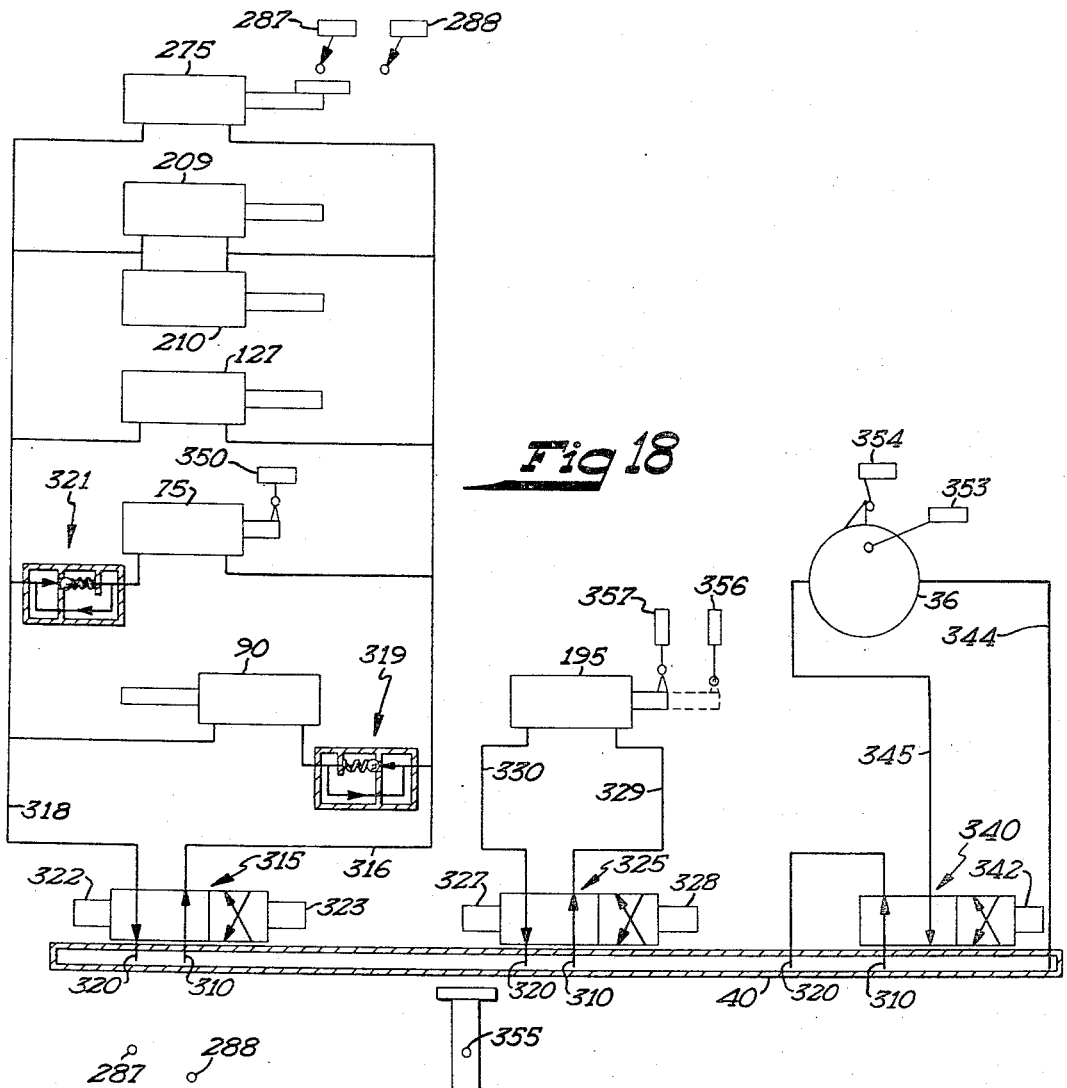
FIGURE 18 is a schematic hydraulic diagram for the various drives of the improved carton forming machine.

The hydraulic circuitry for operating the various actuators and motors of the improved forming machine are shown schematically in FIGURE 18. The self-contained motor and pump forming a part of the hydraulic system and shown only in block at 40 as an enclosed unit pumps hydraulic fluid from a sump through a plurality of supply and return lines to the various actators and fluid motors of the forming machine. Thus it will be seen in FIGURE 18, the motor pump and sump unit, indicated generally at 40, has a pressure outlet 310 directed through a first four-way valve unit shown diagrammatically at 315 which controls the flow of hydraulic fluid to the plurality of hydraulic actuators 90, 75, 127, 209, 210 and 275 to perform the pickup, loading, bottom break, top break and unloading functions of the forming machine. Each of these actuators are connected at one of their fluid ports to a common outlet conduit 316 of the valve 315 with the opposite sides of each of these actuators, that is their other control port, being connected in common through a return or second conduit or pipe 318 through control valve 315 and to a common return line 320 of the hydraulic system. The valve 315 is of the four-way type and includes a pair of solenoids 322, 323 which are adapted to be selectively operated to reverse the operation of the valve. It will be understood that the reversal of operation of the valve will connected the pressure line 310 selectively to one or the other of the common supply lines 316, 318 and at the same time will connect the opposite of the supply lines connected through the valve to the return line 320 to reverse the operation of the respective cylinders or actuators simultaneously. Actuators 90 and 75 have fluid time delay sequencing devices of a conventional design for one direction of operation or flow associated therewith to sequence the operation between these actuators apart from the operation of their main control valve. These units are shown schematically at 319 and 321 respectively, and are basically pressure operated valves which operate in one direction at different pressures to delay the operation of the load actuator until after the pickup actuator has operated and released an open carton blank. In the reverse direction of flow, there is no delay in the flow therethrough. Further, as will be later noted, the actuators 209, 210 of the top break assembly are energized under control of valve 315 and are delayed in their operation on the mandrel at the press station from the sealing operation. This insures that the top flaps of the carton will be bent along scorelines after the press has sealed the bottom of the carton and is still in contact therewith. The actuators 209, 210 are connected to operate simultaneously and in the same direction in their top break function.

The press actuator 195 of the bottom sealing station is similarly supplied with hydraulic fluid from the self-contained unit 40 through a control valve 325 of the four-way type which control valve is operated to reversed positions by solenoids 327 and 328 respectively. The outlet lines from the control valve 325, namely pipes or conduits 329, 330 respectively are connected to opposite ends of the press actuator 195 for the reversible operation of the press. In addition, the fluid actuator or motor 36 driving the spindle is controllably energized from the fluid outlet pressure line 310 of the pump under the control of the three-way valve unit indicated at 340 which valve unit is energized or controlled by a spring biased solenoid 342. In one position of the three-way valve 340, fluid is directed through a pipe or conduit 345 to the fluid actuator or motor 36 with the return line from the motor 344 returning the fluid to the sump. In the other position of the three-way valve, fluid from the source is directed back to the sump through the return line 320 by passing the motor 36.

The disclosure of the hydraulic circuits herein are primarily schematic and are omitted from the remaining views of the disclosure primarily for simplicity. It will be recognized that the valve 315 will control hydraulic fluid flow to the pickup actuator 90, the loading actuator 75, the bottom break actuator 127, the top break actuators 209 and 210 and the unload actuator 275, simultaneously. The press cylinder 195 is is shown schematically as under the influence of a separate valve because of the difference in timing of the operation of these devices. Similarly, the valve 340 operating the fluid motor 36 is separate in that its function in rotating the spindle will take place at periods of time when the remaining cylinders are inoperative.

Figure 19:
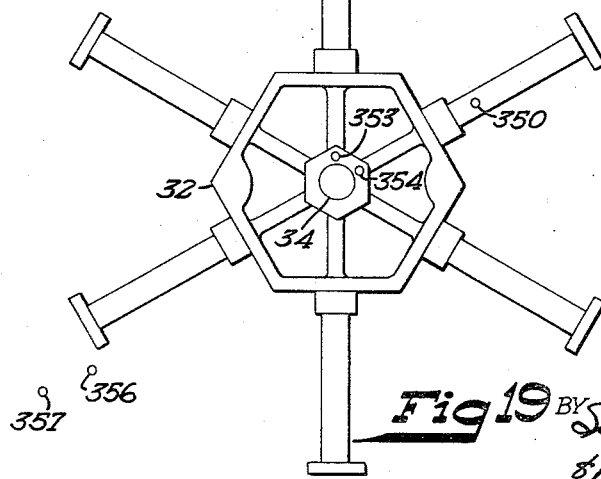
FIGURE 19 is a schematic diagram of the spindle with the mandrels thereon showing the location of the limit switches controlling operation of the electric and hydraulic circuits.

FIGURE 19 shows schematically the spindle with the mandrels thereon and the location of the various limit switches which control the electric circuit in the operation of the carton forming machine. Thus it will be seen in FIGURE 19 that a limit switch 350 is associated with the travel of the actuator 75 in the movement of the shaft (not shown) mounting arm 76 through movement of the actuator 75 to control the operation of the actuator as well as several of the other actuators indicative of the actual positioning of a carton blank on a mandrel. In addition, the transmission or speed control 38 operated by the hydraulic motor 36 has associated therewith limit switches 353 and 354 which are operated by movement of the fluid motor in various stages of operation to effect control in the electrical control circuit and operation of the forming machine. These switches are enclosed within the transmission with the switch 353 being associated with the clutch of the hydraulic motor and transmission to be opened whenever the clutch is in other than a locked position. This insures that the control circuit will not be energized, as will be hereinafter defined, whenever the spindle is manually rotated for maintenance purposes. In addition, the limit switch 354 is connected with the hydraulic transmission and operates as an indexing limit switch indicating limit of travel of the transmission in the stepped movement. The unload actuator 275 has associated therewith limit switches 287 and 288, the limit switch 287 being effective to open the vacuum line and release the carton and the limit switch 288 being indicative of the travel of the actuator 275 in the removal of the carton from the mandrel. Thus the limit switch 288 is a safety limit switch indicative of the clearance of the carton from the mandrel, as will be hereinafter identified. In addition, frame 30 mounts a feeler (not shown) which operates a limit switch 355 at the top portion of the frame to sense the presence of a carton or absence of a carton on the mandrel in the upper position after it has left the unload station. This is a safety limit switch which is normally closed and will be operative only in the event that a carton is not removed from a mandrel in this position. The press actuator has associated therewith limit switches 356 and 357 which indicate the forward and back or return positions of the press. These switches are included in the electrical control circuit to control the sequencing of the various actuators of the other working stations upon movement of the press with the indexing of the spindle being controlled or permitted when the remaining actuators are at rest.

Figure 17:
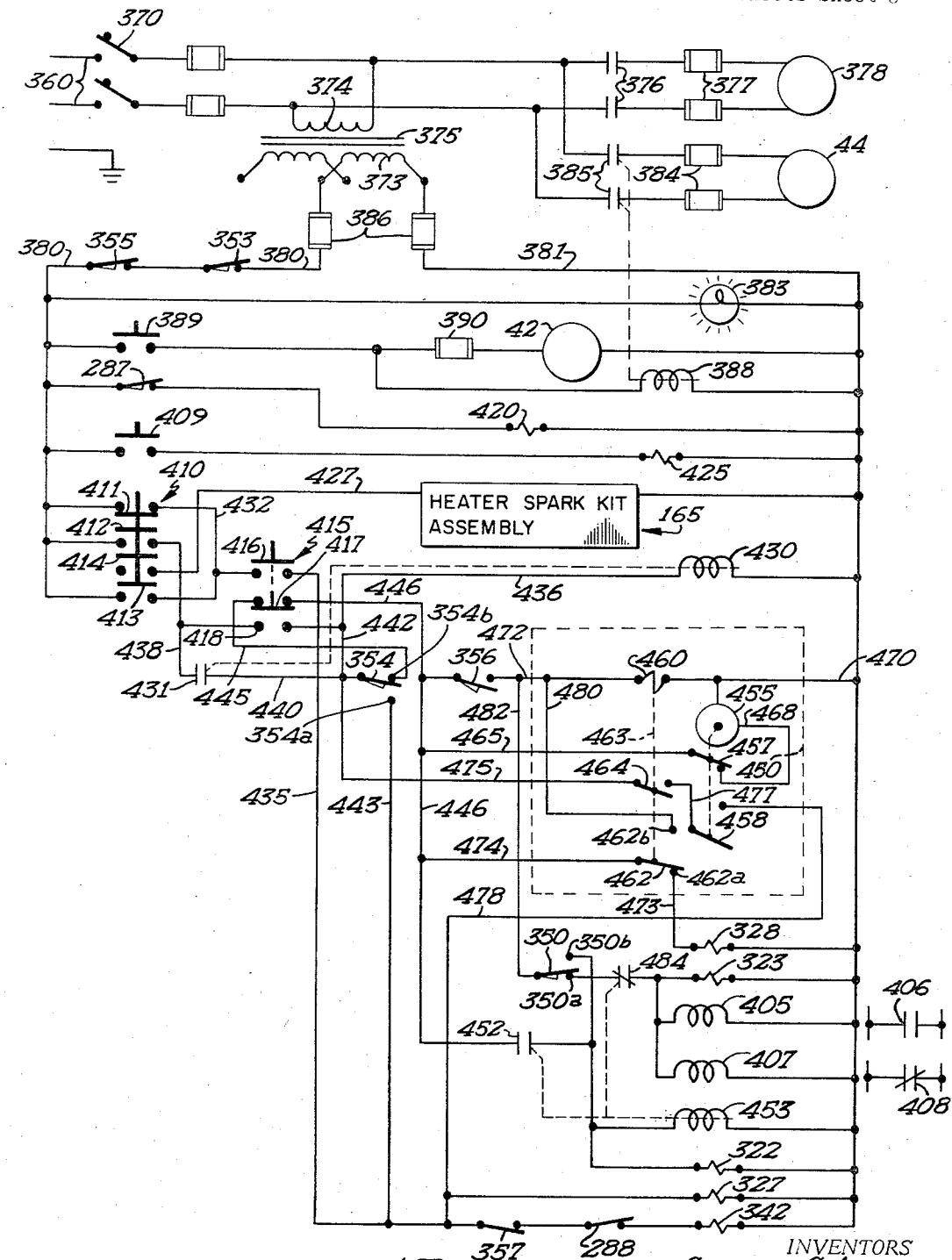
FIGURE 17 is a schematic electrical diagram for the improved carton forming machine.

The electric control circuit for the carton forming machine is shown in FIGURE 17. In an electric circuit, an alternating current source is shown by a pair of conductors 360 having a manually operated switch 370 with contacts positioned in each of the supply conductor lines to provide "on" "off" control for the forming machine. The manually operated switch controls application of power to a control transformer 375 having a primary winding 374 connected across the supply conductors with a secondary winding 373 supplying power at a reduced voltage to a control circuit having principal conductors 380 and 381. The power circuit also includes starter contacts 376 positioned in the supply conductors and fusing 377 leading to an electric hydraulic pump motor 378 which is included in the self-contained package 40. Also in the power circuit, and controlled by contacts 385 of the same starter is the vacuum motor 44, this circuit including individual fusing 384 in the conductor lines.

The control circuit from the transformer 375 includes fusing 386 in each of the conductors 380, 381 with the conductor 380 including also in series circuit the limit switch 353 for the clutch safety in the hydraulic transmission and the unload safety limit switch 355 which determines whether a carton has been removed from the mandrel before the unloaded mandrel approaches the loading position.

The starter whose contacts 376, 385 are positioned in the power circuit, has its control winding 388 connected in the control circuit in series with a first manually operated "on" "off" switch 389 and across the conductors 380, 381 to energize the hydraulic pump motor and provide a source of fluid under pressure from the self-contained hydraulic unit 40 for the forming machine at all times. Also connected across the control conductors 380, 381 and in series with the "on" "off" switch 389 is the air compressor motor 42 which has in series therewith a suitable protective fuse 390. Thus the switch 389 controls energization of the starter winding 388 and the air compressor motor with the starter contacts controlling energization of the hydraulic pump motor and vacuum motor positioned in the power line. In addition, an indicating light 383 is connected between the control conductors 380, 381 to indicate application of power to the control panel with operation of the switch 370. The control circuit also includes a vacuum solenoid valve actuator 420 which is connected across the control conductors 380, 381 and in series with the limit switch 287 positioned at the unload station and operative when opened to de-energize the solenoid valve 420 in series with the vacuum line at the unload station to release the formed cartons from the suction cup. In addition, the vacuum line between the vacuum pump and the respective suction cups which operate to pick up carton blanks from the carton blank holder includes another solenoid valve 425 which is controllably energized through a manually operated switch 409 connected in series therewith and across the control conductors 380, 381. The switch 389 and the switch 409 will be operated between off and on positions whenever it is desired to place the carton forming apparatus in an operative condition and will be maintained in a closed position during normal operation of the carton forming apparatus. The solenoid valve 425 like the solenoid valve 420 are included in the vacuum line between vacuum pump and motor 44 and the respective suction cups to selectively open the vacuum line to atmosphere whenever it is desired to release the vacuum at the cups. Thus to place the carton pickup apparatus in operation, it is necessary to close the manual switch 409 and energize the solenoid 425 in series circuit therewith.

Manual and automatic operation of the improved carton forming apparatus is controlled by a pair of control switches shown generally at 410 and 415 which switches will set the apparatus for manual or automatic control and will effect starting or initiation of the apparatus in a manner to be hereinafter described. The control switch 410 is a two position positive operating unit which includes a plurality of switch contacts in ganged relationship. Thus it includes a normally closed contact 411, and normally open contacts 412, 413 and 414 all of which are connected at one side to the control conductor 380. The control switch 415 is of the momentary operating type and includes a normally open contact 416, a normally closed contact 417 and a normally open contact 418. These switches operated when together effect energization of the heater spark assembly unit 165, suitable control relays, the actuators at the various working stations, the hydraulic transmission for indexing the spindle and the timing unit for the control apparatus, all of which will be described in detail hereinafter. Thus, as will be seen in FIGURE 17, the manually operated switch 410 at its contact 414 is connected to the control conductor 380 at one side thereof and through a conductor 427 to the heater spark assembly 165 controlling the operation of the burner with the other extremity of the assembly 165 being connected to the control conductor 381. Switch 410, as shown in the drawings, has two positions one being a manual operating position and the other an automatic operating position with the switch 414 being closed in the automatic position to supply power to the heater spark kit assembly which includes a suitable valve (not shown) for controlling the gas supply to the burner only when the switch 410 is in the automatic position. Thus the heater will not be energized in the manual switch position of switch 410 and this position, which is normally the rest position, will be used with the start position of switch 415 for indexing the spindle for maintenance and change over purposes. In the manually operated switch 410, the normally closed contact 411 and the normally open contact 413 are connected together by a common conductor 432 and to one side of the normally open contact 416 of the momentary switch 415 with the other side of this momentary and normally open contact being connected to a conductor 435. The conductor 435 leads to the index solenoid 342 and the press return solenoid 327 with the index solenoid 342 having limit switches 357 for the press and the unload safety limit switch 288 in series circuit therewith. The normally open contact 418 of switch 415 is connected at one side to a conductor 436 and a coil 430 of a control relay which is connected at its opposite side to the energizing conductor or supply conductor 381. The other side of this switch contact 418 is connected to a conductor 438 leading to a control contact 431 of the control relay 430 and to one side of the normally open switch contact 412 of the manual switch 410 with the other side of this contact being connected in common with the remaining contacts of the switch 410 to the control supply conductor 380. The control contact 431 of relay 430 is connected through a conductor 440 to a conductor 442 leading to the conductor 436 and the other side of the normally open momentary switch contact 418 to effect a holding circuit around the same. In addition, these conductors 440 and 442 are connected to the common side of the index limit switch 354, which is a single pole double throw type switch, having positions 354a and 354b which represent respectively the position of the limit switch when the spindle is indexing and when the spindle is at rest. The switch 354a is made or closed whenever the spindle is moving and the switch 354b is made or closed whenever the spindle is at rest. The indexing limit switch 354a is connected by means of a conductor 443 to the conductor 435 leading to the indexing solenoid 342 and the press return solenoid 327. The indexing limit switch 354b is connected through a conductor 445 to one side of the normally closed contact 417 of the momentary start switch 415 with the other side of this normally closed contact being connected to a control conductor 446 leading to the timing apparatus for the carton forming machine, indicated generally at 450, and to a holding contact 452 of a second control relay, indicated by coil 453, in the control circuit for the solenoid 322 effecting return of the various actuators other than the press actuator for the carton forming apparatus. The timing unit is comprised of a timing motor 455 which operates a pair of timed contacts 457 and 458 which are operated by adjustable camming (not shown) from the motor. The contact 457 is normally closed when the timing motor is energized and will be opened after a predetermined and adjustable time schedule. This contact 458 is normally open and will be closed or made after the timing period. In addition, the timer unit 450 has a clutch 460 which operates a second set of contacts 462 and 464 respectively through a linkage indicated by the dotted line 463, these contacts being operated instantaneously with energization of the clutch and independent of rotation of the timer motor 455. The switch contact 464 is normally open and will be energized or moved to a closed position with energization of the clutch 460. The switch 462 is of the single pole double throw type having switch contacts 462a and 462b with the switch contact 462a being normally closed whenever the clutch is de-energized and the switch 462b being normally opened and closed whenever the clutch 460 is energized. The timer unit 450 is shown herein schematically in that its details form no part of the present invention. Such a unit is commercially available and one such unit is manufactured by the Eagle Signal Division of E. W. Bliss Co., Davenport, Iowa, under the type No. HP–515A6.

The timer unit 450 is connected to the energizing conductor 446 through a plurality of circuits one of which includes a conductor 465 connected to the conductor 446 and through the timed contact 457, through a conductor 468 to the timer motor 455 and a conductor 470 leading to the supply conductor 381. Similarly, the clutch coil 460 of the timing unit is connected to the conductor 446 through a conductor 472 and with the other side of the clutch coil being connected through the limit switch 356, to the conductor 470 leading to the control supply conductor 381. The instantaneous contact 462 operated by the clutch 460 is connected at one side to the conductor 446 through a conductor 474 with the other side of the switch contact 462a being connected through a conductor 473 to the press advance actuator 328 whose opposite extremity is connected in common with the control supply conductor 381. The other instantaneous contact 464 at one side is connected through a conductor 475 to the common side of the index limit switch 354 and conductor 440 with the other side of the switch 464 being connected by a conductor 477 to the normally open contact 458 of the timed contacts controlled by the timer motor 455 and from the contact 458 through a conductor 478 to the conductor 435 and the press return solenoid 327 and the index solenoid 342. Within the timer unit 450, a conductor 480 connects the clutch coil 460 at conductor 472 with the normally open contact 462b of the instantaneous contacts for the purpose of continuing or holding the energization of the clutch. After opening of the press limit switch and until the index limit switch 354b is opened, the timer is reset internally in a conventional manner after the clutch has been de-energized. The press limit switch 356 which is closed when the press is in a forward position also supplies a control circuit through a conductor 482 which is connected to the conductor 472 and the press limit switch to the limit switch 350 representing the position of the actuator which effects loading of the carton blanks on the mandrel. The limit switch 350 has two operating positions and is represented as a single throw double pole switch with the switch position 350a representing the position of the actuator 75 in the rest or back position and with the contact 350b being normally closed when the load actuator 75 is in the forward position. The limit switch 350a is connected through a normally closed contact 484 of the control relay or coil 453 and to the cylinder advance solenoid 323 leading to the other side of the control supply 381. In parallel with the solenoid 323 are control relays 405 and 407 whose contacts 406 and 408 represent instantaneous and time delay contacts which are normally connected in a circuit of a filling and sealing machine. The limit switch 350 representing the position of the load actuator 75 in the forward position or contact 350b is connected through a conductor 485 to coil 453 of the control relay and the solenoid 322 energizing or controlling the hydraulic valve for moving the actuators of the carton forming apparatus to the return position. This circuit is also connected in common with the holding contact 452 of the relay 453 to set up a holding circuit around the limit switches 356 and 359, as will be hereinafter noted.

In the control circuit for the improved carton forming machine, the hydraulic control circuits from the self-contained motor pump unit 40 will be selectively energized by the solenoid actuators or valves 315, 325 and 340 which control respectively the various hydraulic actuator performing the working functions and advancing the spindle in the stepped rotary movement. Thus the valve 315 through its directional solenoid coils 322 and 323 which will be selectively energized in the electrical circuit control respectively the pickup cylinder or actuator 90, the load cylinder or actuator 75, the bottom break cylinder or actuator 127, the top break cylinders or actuators 290, 210 and the unload cylinder or actuator 275. Movement of these actuators effect operation of the limit switches 287, 288 and 350 depending upon the varying positions of the load and unload cylinders. Similarly, the press actuator 195 is controlled by the solenoid valve 325 whose directional solenoids 327, 328 are selectively energized to move the press actuator and hence the press to opposite positions. Movement of the press through energization of its actuators in the forward and reverse positions will operate respectively the limit switches 356 and 357 of which the limit switch 357 merely serves to limit the operation of the index sole- noid 342 until the press is in a cleared position. The fluid motor 36 driving the spindle is controlled by the solenoid valve 340 whose solenoid 342 is the index solenoid in the electrical control circuit. Movement of the fluid motor or its transmission will operate selectively the limit switches 353 and 354, the limit switch 353 being a safety limit switch in the control representing a safety device which prevents energization of the indexing mechanism until the clutch is in a drive position. The limit switch 354 is a two position limit switch which indicates whether the drive circuit is in a moving or rest position. The press limit switch in the forward position 356 is utilized for energizing of setting up the control circuit to advance the remaining cylinders through an energization circuit for the solenoid 322 to move the valve 315 to a position where the respective cylinders controlled thereby will move in a forward direction. The cylinders will be returned through a separate control circuit established by the index limit switch 354. Thus in the operation, the improved carton forming machine will first index to a rest position after which the press will be operated in a forward direction. Once the press has reached the forward position, control circuits are set up for energization of the remaining solenoids controlling the cylinders of the various working stations toward a forward direction to perform a working function. At the same time the press will be released to move to a rest position after which the cylinders for the remaining stations will move to a rest position. When all cylinders and the press have reached a rest position, the machine will automatically index again under control of the timing unit 450 which is selectively energized or initiated by operation of the press to the forward position and reset by operation of its clutch after a predetermined time cycle.

In the control circuit, the switches 389 and 409 controlling respectively the motors and the vacuum pickup solenoid 425 will normally not be placed in an on or closed position until the machine is set up for automatic operation. For manual operation, the control switch 410 is left in a predetermined position in which only the contact 411 is closed. Thereafter the momentary or start switch 315 may be closed to set up a circuit from the control conductor 380 through the switch contact 411 of the manual switch 410 and the conductor 432 through the contact 416 to the conductor 435. This circuit will energize the index solenoid 342 and the press return solenoid 327, the former being energized through the limit switches 357 and 288 respectively. The hydraulic circuit for the index or transmission mechanism has a slight built in time delay in response such that the press return actuator is always moved to the return position prior to the spindle being indexed. In the manual position of operation none of the remaining actuators are energized and the heater spark assembly is not energized. This position of the switch is utilized to index the spindle in stepped sequence for maintenance, adjustment, and check of the apparatus. The spindle will continue to index as long as the momentary start switch 415 is held deflected and no circuit will be set up by making of a contact 418 inasmuch as the conductor 438 is not connected to the supply conductor 380 until the switch 410 is in the auto position with the contacts 412, 413 and 414 closed.

Whenever it is desired to place the carton forming apparatus in an automatic mode of operation, the switch 410 is moved to a closed or "on" position in which the contact 411 is open and the contacts 412, 413 and 414 are closed. Closure of the contact 414 will set up an energization circuit for the heater spark kit assembly 165 through a circuit which includes control conductor 380, contact 414, conductor 427, heater assembly 165 to conductor 381. Unless and until the switch 415 is deflected, no further energization circuits are provided to initially index the spindle. When the heater assembly 165 is energized, a valve within the assembly is opened to allow gas to move to the burner and a spark ignites the flame with a valve thereafter being controlled by a suitable thermostat element of the self-contained type which is not shown. This thermostat element opens the spark circuit whenever the burner is operating. Similarly, the assembly 165 will control flow of air in the air line allowing air to be deflected to the burner to sustain combustion and deflect the flame to concentrate the same on the bottom of the mandrel above the burner. However, until the switch 389 is closed, the air compressor is de-energized and no air supply is available. Therefore the switch 389 and the switch 409 will be closed energizing the hydraulic pump motor, the air compressor, the vacuum motor and closing the solenoid in the vacuum pickup line. Thereafter, the switch 415 may be depressed closing the normally open contact 416, opening the normally closed contact 417 and closing the normally open contact 418. Switch 415 is of the momentary type and is normally deflected or operated only to initiate operation of the apparatus and thereafter returned to the rest position with suitable circuitry therethrough to sustain the carton forming apparatus in an automatic operating mode. With closure of the contact 416, a circuit is made through contact 413 of the switch 410 to supply current from the control supply conductor 380 and conductor 432 to the conductor 435 energizing the index solenoid 342 and the press return 327. Energization of these solenoids will operate the respective valves to supply hydraulic fluid to the respective actuators for a predetermined mode of operation of the hydraulic transmission operating spindle and the press cylinder. With closure of the contact 418, an energization circuit is set up for the coil of the relay 430 through the contact 412 of switch 410, conductor 438, contact 418, conductor 436, to the coil 430 and the supply conductor 381. This will operate the contact 431 to a closed position setting up a holding circuit around the momentary contact 418 to hold the coil 430 energized. When the spindle has indexed to a rest position, the index limit switch 354 will be operated to the position 354b setting up a circuit through the holding contact 431, the switch 354b, conductor 445, normally closed contact 417, to the conductor 446. It will be understood that the momentary switch upon the starting operation will be released to permit the normally closed contact to provide the energizing circuit through the holding contact 431 to the conductor 446 which energizes the timer unit 450. Upon energization of the conductor 446, the press actuator or solenoid 328 is energized through the conductor 474 connected to the conductor 446 and the normally closed contact 462a of the instantaneous timer contacts. This will allow the solenoid valve controlling the flow of hydraulic fluid to the press cylinder to move the press cylinder toward the mandrel or advance the same. As the switch 415 is released and the limit switch 354 is moved to the rest index position, the conductors 435 and 443 are de-energized de-energizing the press return solenoid 327 and the index solenoid 342. Therefore the press advance solenoid 328 may be energized to move the press in a forward direction closing the limit switch 356.

With energization of the press solenoid 328, the timer motor 455 is similarly energized to start the timing function simultaneous with operation of the press through the circuit extending from the conductor 446 through the conductor 465, the timer contact 457, conductor 468, timer motor 455, conductor 470 to the control supply conductor 381. This circuit will be sustained until the timer motor through its timing mechanism opens the contact 457. With the press moved to the advance position at the end of the index cycle and the press forward, a circuit is set up for the clutch 460 of the timer unit 450 through the limit 356 connected to the conductor 446, conductor 472 and to the conductor 470 and the supply conductor 381. Operation of the clutch will move the instantaneous switch contacts of the timer 464 and 462b to a closed position such that the contact 464 will be made and the contact 462b will be made breaking the circuit through the contact 462a and de-energizing the press advance solenoid 328. With the press limit switch 356 in the forward position, a circuit is also made through the conductor 482 and the load cylinder limit switch 350 in the switch position 350a to energize the cylinder advance solenoid 323 and the timing relays 405 and 407 which are normally connected into the filling and sealing machine. The operation of the instantaneous contact 464 sets up a circuit for initiating the operation of the press and index motor. Operation of contacts 462 operates to break the circuit to the press advance solenoid 328 and sets up a holding circuit on the timer clutch. Thereafter the cylinders controlling the unload function, the bottom break function, the load function, and the pickup function will be energized. Because of the sequencing devices 319 and 321 in a hydraulic circuit for the pickup and load cylinders 90 and 75 respectively, the load cylinder will not be advanced toward the mandrel until the pickup cylinder has actuated and moved a carton blank into position where the arm 76 attached to the load cylinder may advance the same. This sequencing is obtained by the hydraulic pressure valves associated with the respective cylinders. As these cylinders reach their advance position and the load cylinder has moved a carton blank on to a mandrel, the limit switch 350 will be energized to the forward or load position 350b opening the energizing circuit to the solenoid 323 controlling the hydraulic valve 315 and advancing the respective cylinders in the forward direction. With closure of the limit switch 350b, a circuit is set up from the supply conductor 446 which is sustained in an energized position because of the rest position of the index limit switch 354b connected through the holding contact 431 of the control relay 430 and the closed position of the switch contact 412 for the auto position of the switch 410. Current thus applied to the conductor 446 and flowing through the limit switch contact 356 of the press in the forward position will energize the conductor 482 to energize the control relay 453 and close its contact 452 as well as energize the solenoid 322 to operate the hydraulic valve 315 and reverse the direction of flow of hydraulic fluid to the actuators 90, 75, 127, 209, 210 and 275. This will return the respective working cylinders for the pickup, load, bottom break, top break, and unload cylinders respectively to the rest position. The timer motor during this period will have been energized and continuing its timing function. With the cylinders returned, the set timer contact 458 is moved to a closed position setting up an energizing circuit from the conductor 440 which is held energized by the holding contact 431 through the conductor 475, switch contact 464, conductor 477, switch 458, conductor 478, to the press return solenoid 427 and the index solenoid 342. In this position of operation, the index solenoid 342 is not energized inasmuch as the limit switch 357 is open indicating that the press is still in the forward position. Thus the press will be returned to a rest position after which the limit switch 357 will be closed energizing the index solenoid 342. Current will still be applied from the control conductor 446 through the holding contact 452 of the relay 453 to the cylinder return solenoid 322. At this point the second timer contacts 457 opens, breaking the energization circuit to the motor with the clutch 460 of the timer unit 450 still energized. With the press returned toward its rest position and when the index switch 354b opens the clutch 460 is de-energized and this operation will reset the timer contacts 457 and 458 to their initial positions in which the contact 457 is closed and contact 458 is opened. With the reset operation, the indexing of the spindle is completed and opening of the contact 458 will de-energize the press return solenoid and index solenoid.

The resetting operation of the timer contact 462 to the switch position 462a will permit energization of the press solenoid after the index switch 354 returns to the rest position 354b re-establishing the circuit through the conductors 440, 445, to the conductor 446, conductor 472, switch 462a, conductor 473 to the press advance solenoid 328. At this point, the cycle is repeated in that the press limit switch 356 is open and the timer motor 455 is re-energized to start the timing function. When the press limit switch reaches a closed position, the clutch 460 of the timer will again be energized to open the switch contact 462a and de-energize the press solenoid 328 and energize the cylinder advance solenoid 323. With the cylinders moved to the advance position, the limit switch 350 is reversed to set up the energizing circuit for the solenoid 322 and reverse the operation of the cylinders. At the end of the timing cycle the press is returned with energization of its return solenoid 327. Thus, automatic operation of the press cylinder and the remaining cylinders of the carton forming apparatus will take place in a predetermined sequence being initiated by the operation of the press cylinder following the indexing of the spindle. The timing for these operations will be effected by control of the timer motor or its setting cams to adjust the interval in the operation of the timer which will control the release of the press actuator and initiate the indexing operation. The vacuum circuit for the solenoid 420 is controlled by the position of the unload actuator which operates the limit switch 287 whenever the vacuum cup has withdrawn a completed carton blank from a mandrel and has reached a predetermined position of travel of the actuator 275. De-energization of this solenoid through opening of the limit switch 287 will release the vacuum at this suction cup to release a carton at the discharge end of the carton forming machine. The solenoid 425 will remain energized throughout the automatic operation of the apparatus through closure of the manual switch 409. The continuous application of vacuum pressure to the carton pickup manifold 88 is controlled through this solenoid but the suction or vacuum will be released by the operation of its valve 89 with the positioning of the manifold through its actuator 90. Thus the valve mechanism incorporated in the manifold will be operated whenever the manifold reaches a predetermined position to release the vacuum circuits effecting only the cups on the pickup mechanism and whenever a carton rests against the stops and the unloading arm is about to engage the same. The heater will be normally energized with closure of the switch 410 to the automatic position and the air compressor 42 will remain energized along with a hydraulic motor pump unit and vacuum motor with operation of the switch 389. The air supply to the heater will permit combustion at the burner and will concentrate air around the flame to direct it onto the exposed carton flaps positioned above the same for most efficient and rapid tempering or softening of the thermoplastic coating of the cartons preparatory to sealing of the same. The step sequence of the spindle is controlled by the limit switch 354 and the safety limit switch 353 prevents energization of the solenoid valve 340 until the spindle is in a clutch engage position. Further, the entire energizing control circuit is prevented from operation by the carton safety limit switch 355 which detects the presence of a carton beyond the carton release or removel station. Thus, should the unload cylinder fail to effect a release of a carton from the mandrel, its presence will operate the associated feeler to energize the limit switch 355 and open the control supply conductor 380 shutting down the carton forming machine.

The improved carton forming machine will insure that the carton is conditioned for filling and sealing in the operation of a single machine. The top break solenoids 209, 210 operated at the same station with the press actuator 195 will insure that the top flaps of the carton blank are properly conditioned for immediate application of the carton to a filling and sealing machine. The solenoids operating the flap or plate members break the infold flaps of the smaller carton sizes against the shoulder 60 of the mandrel sleeves and in the case of the larger carton sizes will operate to break the outfold flaps as the fingers 62 on the mandrel supports hold the infold flaps deflected. Further, the carton unloader will properly position the carton blank in an erected position through engagement of the deflecting plate at the outlet side thereof so that it may deposit a carton on the filling and sealing conveyor for immediate use. This is accomplished by rotating the carton blank along the axial extent of the same in the event that the side flaps of the various carton sizes are not properly aligned for immediate use of the filling machine. A latch system insures that this structure may be employed or omitted depending upon the size of cartons being run on the carton forming machine.

In the consideration of this invention it should be remembered that the present disclosure is intended to be illustrative only and the scope of the invention should be determined by the appended claims.

What is claimed is:
1. A machine for erecting a flat carton blank, comprising:
 (a) a frame structure;
 (b) a spindle rotatively mounted on the frame upon a horizontal axis and including motive means adapted to rotate the spindle relative to the frame structure about an axis of rotation in a stepped movement;
 (c) a plurality of mandrels mounted on the spindle and extending radially therefrom about the axis of rotation of the spindle;
 (d) a plurality of work stations positioned on the frame structure a substantially vertical plane normal to the axis of rotation and adjacent the ends of the mandrels on the spindle;
 (e) a carton blank dispensing means positioned at a first of said stations and operative to erect a flat carton blank and advanced the erected carton blank onto a mandrel on the spindle;
 (f) a carton blank break means included in the second of said stations and operative to pre-bend all of the bottom flaps of the carton in a stepped sequence bending certain of said bottom flaps upon other of said bottom flaps;
 (g) heating means positioned at the third of said stations and located vertically beneath the axis of rotation of the spindle being operative to heat the prebent bottom flaps of the carton blank;
 (h) flap folding means including guide rails positioned between the third of said stations and a fourth station on the frame and operative to fold the heated bottom flaps of the carton preparatory to sealing the same;
 (i) pressure sealing means including a press plate movable toward and away from the spindle and positioned at the fourth of said stations being operative to engage the end of the mandrel and the heated and folded bottom flap of the carton to seal the bottom of the carton on the mandrel;
 (j) top flap pre-break means included on the frame structure adjacent the fourth station operated substantially simultaneously with movement of the pressure sealing means to break the top flaps of the carton;
 (k) carton removal and inverting means positioned at a fifth of said stations and operative to remove the pre-formed and pre-bent carton blank from a mandrel on the spindle;
 (l) means included in the carton removal means for rotating the carton after it is removed from the mandrel and before the inverting means is operative to invert the carton;
 (m) and control circuit means including timing means for operating each of the means at the respective work stations substantially simultaneously after which the motive means steps the spindle.

2. The machine for erecting a flat carton blank of claim 1 in which the plurality of mandrels are six in number and each of the mandrels has an adjustable sleeve mounted thereon with varying sized shoulders on the adjustable sleeve axially movable over the length of the mandrel, together with a plurality of removable end caps of varying cross-section to accommodate various sized carton blanks.

3. The machine for erecting a carton blank of claim 2 in which the heating means is a burner mounted on the frame in proximity with the ends of the mandrels as they are moved in stepped movement.

4. The machine for erecting carton blanks of claim 3 in which the heating means includes means mounted on the frame structure for adjusting the spacing between the heating means and the ends of the mandrel for varying sized carton blanks.

5. The machine for erecting carton blanks of claim 4 in which the carton removal means in a single suction cup mounted on a shaft slidably mounted in the frame for movement toward and away from the ends of the mandrel.

6. The machine for erecting carton blanks of claim 5 in which the carton blank removal means includes a cam means and a slidable mounting for the same on the frame structure and a rack positioned to co-operate with an extremity on the shaft mounting the suction cup at a geared surface thereon, said cam means being operative to move the rack and rotate the suction cup prior to the release of the carton blank and after the carton had been freed from the mandrel to rotate the carton about its longitudinal axis prior to inversion of the same.

7. The machine for erecting carton blanks of claim 6 in which the carton inverting means is a curved plate mounted on the frame structure and adapted to be engaged by the carton blanks after release by the carton removal means and including means for adjusting the angle of the curve plate to invert various sized cartons.

8. The machine for erecting carton blanks of claim 7 in which the curved plate of the carton inverter is pivoted at one extremity and slidably mounted in slots on the frame structure to adjust the angle of the plates relative to the frame structure.

9. The machine for erecting flat carton blanks of claim 8 in which the carton blank dispensing means includes a manifold having a plurality of suction cups thereon and a vacuum line extending to the manifold with a manifold being reciprocated between blank engaging and blank releasing positions and in which the manifold has valve means positioned between certain of said suction cups to engage selectively various sized carton blanks in a dispensing of the same.

10. The machine for erecting flat carton blanks of claim 9 in which the top flap pre-break means includes finger holding guides on the mandrel and pivoted flap means positioned on either side of the carton blank on the mandrel having operating means energized to pivot the flap means simultaneous with the operation of the pressure sealing means.

11. The machine for erecting flat carton blanks of claim 10 in which the pivoted flap means connected thereto are positioned on a support slidably mounted in the frame structure on either side of the spindle with the mandrels thereon to be adjustably positioned relative to the mandrels on the spindle to engage the top flaps of varying sized cartons mounted on the mandrels.

12. The machine for erecting flat carton blanks of claim 11 in which the pivoted flap means are triangular shaped plates adapted to engage in the infold flaps on small carton blank sizes and outer fold flaps on larger carton blank sizes at the top thereof.

13. The machine for erecting and forming flat carton blanks of the gable top type comprising: an upright frame structure; a spindle pivotally mounted on the frame structure for rotation about a horizontal axis and including hydraulic motive means and clutch means adapted to rotate the spindle relative to the upright frame structure about the horizontal axis of rotation in stepped movement; a plurality of spaced mandrels mounted on the spindle and eminating radially from the axis of rotation to be rotated in a vertical plane; means included on the upright frame structure and positioned adjacent the path of movement of the plurality of mandrels on the spindle for erecting a flat carton blank, positioning the carton blank on the plurality of mandrels, pre-bending the bottom flaps of the tubular carton blank, heating the pre-bent flap, folding and sealing the bottom flaps of the carton blank to form a bottom for the carton; additional means included on the frame structure and operative simultaneously with the sealing means for the bottom of the carton to pre-break the top flaps of the carton on the mandrel; and means for removing the inverted carton from the mandrels and rotating the carton about its longitudinal axis after removal of the carton from the mandrel together with inverting the carton to an upright position.

14. The machine for erecting and forming the flat carton blank into a gable top type carton of claim 13 in which the heating means is located on the claim structure at the lowermost point of travel of the rotating mandrels on the spindle and is comprised of a flame burner exposed to the bent flaps for heating the same.

15. The machine preforming the flat carton blanks into the gable top type cartons of claim 14 in which the burner is adjustably mounted on the frame structure beneath the path of travel of the rotating mandrel to vary the proximity of the burner with the extremities of the mandrels and hence the amount of heat applied to the broken carton flaps.

16. The machine preforming a flat carton blank into a gable top type carton of claim 15 in which the motive means for rotating the spindle of the hydraulic drive with a slip clutch thereon permitting movement of the spindle independent of the drive and in which at least one mandrel on the spindle is always without a carton blank permitting cooling of the same.

17. The machine for preforming a flat carton blank into a gable top type carton of claim 13 in which the means for rotating the carton about its longitudinal axis after removal of the carton from the mandrel is comprised of a suction cup journaled in a slidable frame and oscillated toward and away from the mandrel with a gearing portion on the journal section of the suction cup and a slidable rack associated therewith and spring biased for movement relative to the geared and journaled portion of the suction cup to rotate the suction cup in its journal after the carton has been removed from the mandrel and before the carton is released by the suction cup.

18. The machine for preforming the flat carton blank into a gable top type carton of claim 17 in which the slidable rack for rotating the suction cup includes cam means and a biasing spring for moving the rack and means for latching the rack in a fixed position to prevent rotation of the suction cup under latched conditions.

19. The machine for erecting and forming flat carton blanks of the gable top type of claim 13 in which the means included on the upright frame structure for pre-bending the bottom flaps of the tubular carton blank includes finger means operated in a scissor type action to engage certain of the bottom flaps of the carton blank on the mandrel to bend the flaps along score lines and additional pivoted means operated along an axis normal to the axis of operation of the finger means to engage other of the bottom flaps of the carton blank to crease said other of said bottom flaps of the carton blank along its score lines with said carton blank pre-bending means including a single motive means to operate the finger means and pivoted means in a sequence.

20. The machine for erecting a flat carton blank of claim 1 in which the carton blank break means included in the second of said stations and operative to pre-bend all of the bottom flaps of the carton includes a pair of flap engaging and deflecting means each having a pair of scissor members adapted to engage flap portions on opposite surfaces of a carton to bend the flaps inwardly upon score lines with each of the pair of flap engaging means being operated separately and sequentially to engage different sides of the carton blank with the inward bending of the flaps taking place in directions normal to one another.

21. The machine for erecting and forming a flat carton blank of claim 19 and including means for limiting the degree of inward bending movement of the first of the bending operations which movement is adjustable for varying sized cartons.

22. The machine for erecting a carton blank of claim 3 in which the burner of the heater means has a pressurized air source associated therewith to direct flame toward the carton blank mounted on the mandrel.

References Cited

UNITED STATES PATENTS

| | | | |
|---|---|---|---|
| 3,207,049 | 9/1965 | Monroe et al. | 93—44.1 |
| 3,248,841 | 5/1966 | Heffelfinger et al. | 93—44.1 |

BERNARD STICKNEY, *Primary Examiner.*